US009683856B2

(12) United States Patent
Iyer et al.

(10) Patent No.: US 9,683,856 B2
(45) Date of Patent: Jun. 20, 2017

(54) EVACUATION NAVIGATION DEVICE

(71) Applicant: Trimble Navigation Limited, Sunnyvale, CA (US)

(72) Inventors: Prakash Iyer, San Jose, CA (US); Lea Ann McNabb, San Jose, CA (US)

(73) Assignee: Trimble Inc., Sunnyvale, CA (US)

( * ) Notice: Subject to any disclaimer, the term of this patent is extended or adjusted under 35 U.S.C. 154(b) by 41 days.

(21) Appl. No.: 14/461,951

(22) Filed: Aug. 18, 2014

(65) Prior Publication Data

US 2016/0047663 A1    Feb. 18, 2016

(51) Int. Cl.
G01C 21/00    (2006.01)
G01C 21/34    (2006.01)
G01C 21/20    (2006.01)

(52) U.S. Cl.
CPC ....... G01C 21/3415 (2013.01); G01C 21/206 (2013.01)

(58) Field of Classification Search
None
See application file for complete search history.

(56) References Cited

U.S. PATENT DOCUMENTS

| 6,360,101 B1* | 3/2002 | Irvin | H04W 4/021 455/456.6 |
| 2011/0076946 A1* | 3/2011 | Hillebrand | G06F 19/3418 455/41.2 |
| 2011/0136463 A1* | 6/2011 | Ebdon | G01C 21/20 455/404.1 |
| 2013/0116922 A1* | 5/2013 | Cai | G01C 21/206 701/515 |
| 2013/0332273 A1* | 12/2013 | Gu | G06Q 30/0205 705/14.53 |

* cited by examiner

Primary Examiner — Adam Tissot
(74) Attorney, Agent, or Firm — Kilpatrick Townsend & Stockton LLP

(57) ABSTRACT

An evacuation navigation device disclosed. In one embodiment, the evacuation navigation device comprises a position determining component configured to determine a position of a handheld device within a selected environment having access to at least one positioning system. The device further comprises a display device configured to display the position of the handheld device on a digital map of the selected environment and at least one evacuation route from the position to an evacuation position. The device further comprises a wireless communication component configured to receive a real-time update of safety conditions along the at least one evacuation route. The device further comprises logic implemented by a processor for dynamically revising the digital map based upon the real-time update.

17 Claims, 10 Drawing Sheets

500

---

MANAGING A REAL-TIME DIGITAL MAP OF A SELECTED ENVIRONMENT USING A CONTROL SYSTEM IMPLEMENTED BY A PROCESSOR
510

↓

STORING THE REAL-TIME DIGITAL MAP OF THE SELECTED ENVIRONMENT USING A DATA STORAGE REPOSITORY COUPLED WITH THE CONTROL SYSTEM
520

↓

CONVEYING DATA REGARDING THE SELECTED ENVIRONMENT, INCLUDING THE REAL-TIME DIGITAL MAP, TO AN EMERGENCY RESPONDER AGENT IN RESPONSE TO THE TRIGGERING OF AN EMERGENCY NOTIFICATION REGARDING THE SELECTED ENVIRONMENT USING AN EMERGENCY RESPONDER REPORTING COMPONENT IMPLEMENTED BY THE PROCESSOR
530

DETERMINING A POSITION OF A HANDHELD DEVICE COMPRISING A POSITION DETERMINING COMPONENT BASED UPON INFORMATION RECEIVED FROM A POSITIONING SYSTEM AVAILABLE WITHIN A SELECTED ENVIRONMENT
810

↓

DISPLAYING SAID POSITION OF SAID HANDHELD DEVICE ON A DIGITAL MAP OF SAID SELECTED ENVIRONMENT AND AT LEAST ONE EVACUATION ROUTE FROM SAID POSITION TO AN EVACUATION POSITION USING A DISPLAY DEVICE OF SAID HANDHELD DEVICE
820

↓

RECEIVING A REAL-TIME UPDATE OF SAFETY CONDITIONS ALONG SAID AT LEAST ONE EVACUATION ROUTE USING A WIRELESS COMMUNICATION COMPONENT OF SAID HANDHELD DEVICE
830

↓

DYNAMICALLY REVISING SAID DIGITAL MAP BASED UPON SAID REAL-TIME UPDATE USING LOGIC IMPLEMEMENTED BY A PROCESSOR OF SAID HANDHELD DEVICE
840

FIG. 8

EVACUATION NAVIGATION DEVICE

RELATED APPLICATION SECTION

This application is related to co-pending U.S. patent application Ser. No. 14/461,970, filed on Aug. 18, 2014 entitled, "RESPONDER-READY REPORTING NETWORK" by Lea Ann McNabb and Prakash Iyer, and assigned to the assignee of the present application.

BACKGROUND

Most buildings have a set of blueprints on file with a public agency such as a building inspector. For many buildings, these blueprints reflect the proposed or intended layout of the building. However, during the construction process, changes often are made to the layout of the building which may not be reflected in the blueprints on file. Furthermore, these blueprints may be stored as multiple records at multiple locations making it difficult to locate and access these records by emergency responders during an emergency, especially on weekends and holidays when no-one is typically working at the public agency's office. As a result, emergency responders may not have an accurate, if any, set of documents which reflect the current configuration of a building, or other selected environment during an emergency.

Most public buildings display an evacuation map showing the present location of a person viewing the map and the route to the closest exit. However during an emergency, a person may have a hard time remembering the route to the closest exit due to panic or excitement. Furthermore, the map is static in that it only shows one route which may become blocked or unusable due to heat, fire, smoke, debris, etc. In such an instance, the person may not have enough information to safely evacuate.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

FIG. 5 is a flowchart of a method of implementing a responder-ready reporting network in accordance with various embodiments.

FIG. 8 is a flowchart of a method of for displaying evacuation information in accordance with various embodiments.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "managing," "storing," "conveying," "receiving," "updating," "generating," "reporting," "providing," "sending," "downloading," "using," "selecting," "storing," "determining," "displaying," and "revising" to transform the state of a computer system," or the like, refer to the actions and processes of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Figure 1:
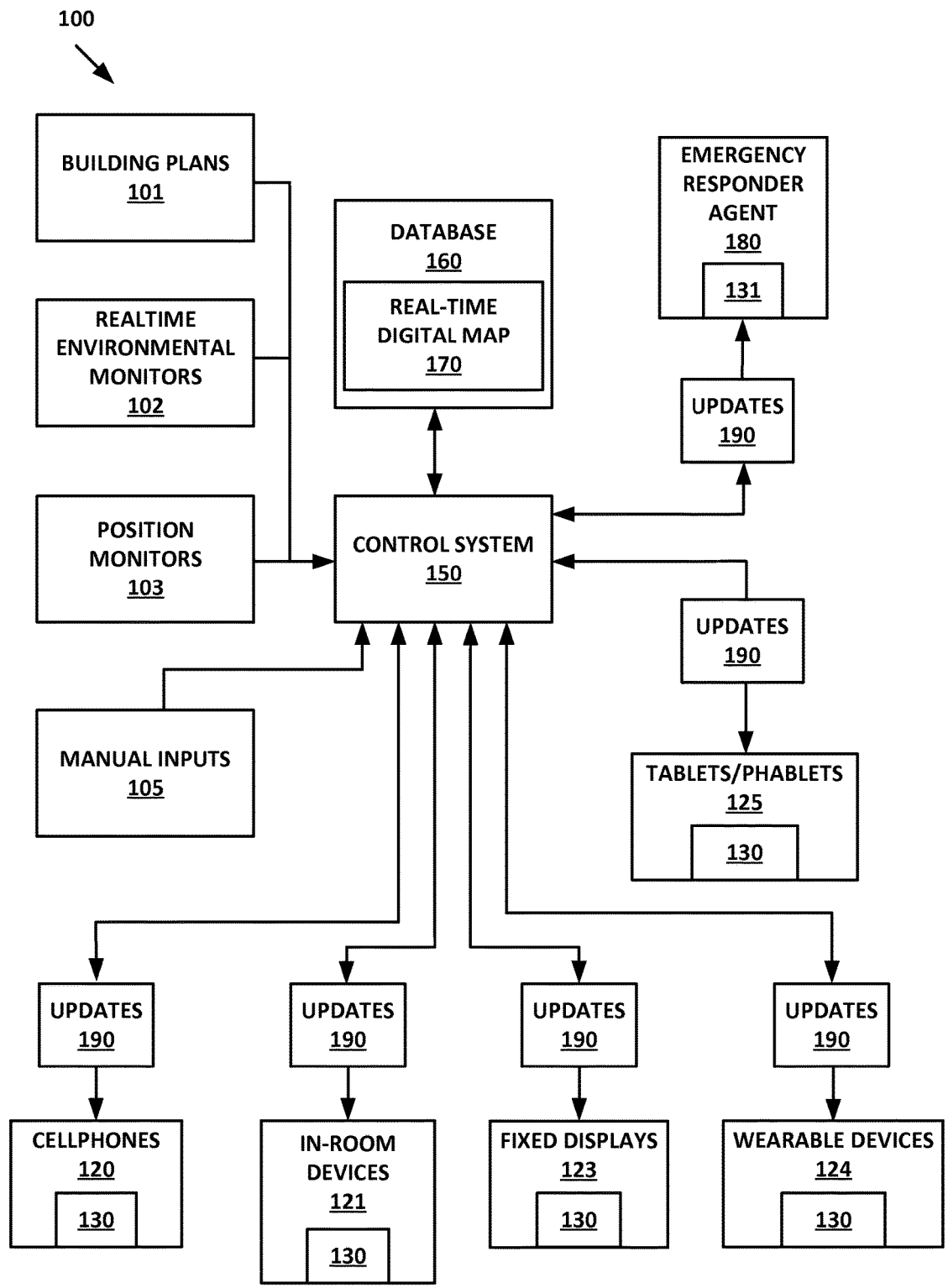
FIG. 1 is a diagram of an example responder-ready reporting network and emergency evacuation system in accordance with various embodiments.

FIG. 1 is a diagram of a responder-ready reporting network and emergency evacuation navigation system 100 in accordance with various embodiments. In accordance with various embodiments, system 100 comprises a set of digital building plans 101 which are accessed by a control system 150 and stored in a non-volatile database 160. System 100 further comprises real-time environmental monitors 102 and a positioning network comprising position monitors 103 disposed within a selected environment, and manual inputs 105 coupled with control system 150. In the embodiment shown in FIG. 1, control system 150 is configured for two-way communications with cellphones 120, in-room devices 121, fixed displays 123 (e.g., a wall-mounted electronic display device, an information kiosk, etc.), wearable devices 124 (e.g., an optical head-mounted display such as Google Glass, a wrist-worn computer system, etc.), tablets/phablets 125, and an emergency responder agent 180. The term "phablets" refers to a class of handheld devices which have a larger form factor than a cellphone, but smaller than a typical tablet computer. In accordance with various embodiments, communication between control system 150 and the other components described above can be accomplished using wired or wireless communication links, or a combination thereof.

In accordance with various embodiments, system 100 is used to record, in a single data package, the most current configuration of a selected environment for use by emergency responders. For the purposes of the following discussion, the selected environment monitored and reported by system 100 will be described as a building (e.g., building 400 of FIG. 4). However, in accordance with various embodiments, the selected environment comprises a constructed environment such as a building, refinery, mining operation, a subway or other sub-surface feature, a ship, etc. in contrast to an open space out-of-doors environment. That is, the selected environment is an environment, such as an indoor environment or constructed environment, in which GNSS signals broadcast from GNSS satellites cannot be received reliably or even at all. Additionally, system 100 can be used to monitor, in real-time, environmental conditions of building 400, to automatically detect emergency events, and to provide real-time reporting of conditions in building 400 (e.g., real-time reports of environmental data) to emergency responders during an emergency. In at least one embodiment, system 100 is configured to dynamically generate alternate evacuation routes in real-time based upon reported environmental conditions within building 400 as well as to report changes in evacuation routes to emergency responders. As will be discussed in greater detail below, system 100 is also configured to monitor the position of devices (e.g., within building 400) at least during an emergency and to report the position of these devices to an emergency responder agent 180. As will be discussed in greater detail below, emergency responder agent 180 can be a person working for an emergency responder agency, or computer system (e.g., a desktop computer system, a laptop computer system, a tablet computer system, a smartphone, a wearable device (e.g., an optical head-mounted display such as Google Glass, a wrist-worn computer system, etc.), or other type of user portable computing device) used by an emergency responder agency, or an agency itself such as an emergency call center (e.g., 911 call center, E911 call center, a NG911 call center, etc.). System 100 can also be used to facilitate communications between emergency responders and people/devices within building 400. Furthermore, system 100 is configured to report to emergency responders when people/devices have successfully reached an evacuation location. According to various embodiments, an evacuation location can be outside of building 400 comprising system 100, or within building 400 such as a tornado shelter, fireproof room, earthquake shelter, etc.

In accordance with various embodiments, digital building plans 101 comprises a set of as-built blueprints of building 400 monitored and reported by system 100. The as-built blueprints represent the configuration of building 400 as it was implemented rather than how it was envisioned in the building application process. In accordance with various embodiments, building plans 101 at least include 2-D plans of building 400 and can further include 3-D plans as well. For example, often during the construction process changes have to be made to the configuration of building 400 due to unforeseen circumstances, or modifications requested by a client or regulating authority. This can include the location of walls, entrances, stairwells, elevators, escalators, and windows, as well as utility features such as pipes, electrical wiring and circuit boxes, gas lines, construction materials used, flammable/toxic materials storage, stand pipes, sprinkler systems, etc. Additionally, the digital building plans 101 can comprise a more complete representation than is generally available to the public. For example, a hotel guest will have an evacuation map in their room which typically shows an evacuation route down a hallway to the nearest fire exit. This evacuation map typically does not show non-public spaces such as service elevators, corridors, kitchen or storage spaces, etc. which may be used as alternate evacuation routes in some instances. In accordance with various embodiments, the digital building plans 101 can be generated in real-time during the construction of building 400, or can be a set digital blueprints which are subsequently updated.

In the case of older building which may not have a digital record on file (e.g., having only paper blueprints), a set of digital building plans 101 can be created by a third party. For example a service can be provided by a third party to generate a set of digital building plans 101 of a building (e.g., building 400 of FIG. 4). This can be as simple as using a Global Navigation Satellite System (GNSS) receiver to locate the features of a building such as hallways, doors, etc., or can be a more comprehensive data set generated using, for example, a 3-D laser scanner to generate a point cloud showing in greater detail the features of the building. Alternatively, a surveying total station can be used to create a detailed set of digital building plans 101. Other methods of generating digital building plans 101 in accordance with various embodiments can implement using a position aware image capture device to derive digital building plans using the position of the image capture device as well, as its azimuth in some cases, to derive the configuration of building 400. It is noted that further processing of captured images, such as photogrammetry, can be implemented to derive the digital building plans 101. One example of a service capable of generating digital building plans 101 is the Trimble Indoor Mobile Mapping Solution (TIMMS) by Trimble Navigation Ltd. of Sunnyvale, Calif. This service uses LiDAR and spherical video imaging to generate 2-D and 3-D maps of areas, including GNSS-denied areas, wide-area indoor mapping, and indoor geo-referenced spherical camera data. Other sources of digital building plans 101 can be derived from other imaging sources such as the indoor Google maps service or the HERE maps service provided by Nokia. In another example, the geographical positions of position aware devices such as cellphones can be received by a mapping system and analyzed to determine the location of high traffic areas, rooms or spaces which are or are not likely to be occupied, materials used in spaces, location of obstructions, etc. As stated above, control system 150 receives digital building plans 101 and stores them as a real-time digital map 170 in database 160. Control system 150 can also receive other data to include with real-time digital map 170 which would benefit emergency responders. For example, the location of stand-pipes, sprinklers, building materials, breathing apparatus, fire hydrants in the vicinity of building 400, location and type of hazardous materials on site, location of gas lines, electrical equipment, access points for elevators, phones and shutoffs, street plans and access points, and special conditions or features (e.g., a helipad) can all be included in real-time digital map 170. Additionally, images of building 400 can be included in the data set comprising real-time digital map 170. For example, images from each direction, as well as aerial images, can be beneficial in an emergency. Furthermore, a variety of identifiers such as building name, building street address, the latitude and longitude of the building or features of the building as described above, and other images such as interior images, can be included in the data set comprising real-time digital map 170. This information can be manually input (e.g., manual inputs 105) or digitally accessed by control system 150. Because control system 150 is configured to modify real-time digital map 170 whenever changes are made, real-time digital map 170 comprises the most up-to-date and accurate representation of building 400 monitored and reported by system 100. This is a great benefit to emergency responders who are often entering the building 400 for the first time and are not familiar with the area and/or layout of building 400. In particular, aerial images and latitude/longitude information are beneficial to helicopter pilots in locating building 400. In accordance with various embodiments, real-time digital map 170 further comprises a display of the position, within or proximate to building 400, of each registered device (e.g., cellphones 120, in-room devices 121, fixed displays 123, wearable devices 124, and tablets/phablets 125). This is a great benefit to emergency responders in locating people within building 400 who may require assistance in evacuating building 400 during an emergency.

In accordance with various embodiments, real-time environmental monitors 102 are embedded within the constructed environment monitored and reported by system 100. Examples of monitoring devices comprising real-time environmental monitors 102 include, but are not limited to: smoke monitors, heat monitors, gas monitors (e.g., CO monitors, $CO_2$, monitors, natural gas monitors, radon monitors, toxic fume monitors, etc.), light monitors, radiation monitors, earthquake monitors, cameras (e.g., video cameras, infra-red cameras, thermal imagers, light intensifying cameras, etc.) and other devices which can report conditions within building 400 monitored and reported by system 100. Real-time environmental monitors 102 report these conditions, either continuously or periodically, to control system 150 which can use this data to update real-time digital map 170 and to dynamically update 190 evacuation routes which can be sent to cellphones 120, in-room devices 121, fixed displays 123, wearable devices 124, and/or tablets/phablets 125. In at least one embodiment, real-time environmental monitors 102 will continuously report environmental conditions when an emergency is triggered by control system 150. In accordance with various embodiments, when an emergency notification has been triggered, each of the sensors comprising environmental monitors 102 will regularly generate an intermittent signal. This provides information to control system 150 that the sensors are working. Thus, if control system 150 determines that a given environmental monitor 102 has stopped sending this intermittent signal, it may be assumed that the environmental monitor 102 has become damaged such as by a fire. This may affect the calculation of an evacuation route such as by causing control system 150 to re-direct evacuation routes around the damaged environmental monitor 102. In at least one embodiment, control system 150 may collect and analyze additional information from proximate environmental monitors 102 as well. For example, if a smoke monitor stops sending the intermittent signal, control system 150 may access cameras, $CO_2$ monitors, heat monitors, etc. proximate to the smoke monitor to determine whether there is actually a fire in the area proximate to the smoke monitor. If there is no indication of damage in the area proximate to the smoke monitor which has ceased sending intermittent signals, control system 150 may determine that it is simply an anomaly and not re-route evacuation routes to different areas. Thus, in accordance with various embodiments, real-time management of real-time digital map 170 includes, but is not limited to, updating real-time digital map 170 based upon data sent in real-time from environmental monitors 102.

In accordance with various embodiments, position monitors 103 are embedded within a constructed environment monitored and reported by system 100 and are configured to report the location of a registered handheld wireless device to control system 150. In accordance with various embodiments, handheld wireless devices include, but are not limited to, cellphones 120 (e.g., smartphones), in-room devices 121, laptop computer systems, tablet computer systems (e.g., tablets/phablets 125), personal digital assistants, personal navigation devices, etc. It is noted that various embodiments are not limited to handheld devices alone. For example, at least one embodiment position monitors 103 are configured to report the location of other user portable devices including, but not limited to a wearable devices 124 (e.g., an optical head-mounted display such as Google Glass, a wrist-worn computer system, etc.). Examples of position monitors 103 in accordance with various embodiments include, but are not limited to, devices configured to operate on/in compliance with any suitable wireless communication protocol including, but not limited to: Wi-Fi, WiMAX, implementations of the Institute of Electrical and Electronics Engineers (IEEE) 802.11 standard, implementations of the IEEE 802.15.4 standard for personal area networks, and a short range wireless connection operating in the Instrument Scientific and Medical (ISM) band of the radio frequency spectrum in the 2400-2484 MHz range (e.g., implementations of the Bluetooth® standard) including Bluetooth Low Energy (BLE) implementations, implementations of the IEEE 1902.1 (RuBee) standard, implementations of IEEE 802.15 (ZigBee) standard, etc. It is noted that position monitors 103 are not limited to wireless networks alone and can comprise wired or wireless communication networks, or a combination of both. In accordance with various embodiments, control system 150 is configured to monitor and/or report in real-time the location of any registered device while it is in building 400 monitored by system 100. Thus, in accordance with various embodiments, real-time management of real-time digital map 170 includes, but is not limited to, updating real-time digital map 170 based upon data sent in real-time from position monitors 103.

In accordance with various embodiments, manual inputs 105 allows an operator to input data which may not be accessible in digital form by control system 150. For example, registration of handheld wireless devices (e.g., cellphones 120, in-room devices 121, wearable devices 124, and/or tablets/phablets 125) can be performed via manual inputs 105. For example, each in-room device 121 in building 400 can be manually registered to control system 150, including the room in which it is normally disposed, using manual inputs 105. Similarly, a guest or visitor to building 400 can provide the phone number to their cellphone 120, wearable device 124, and/or tablet/phablet 125 which can be manually registered with control system 150 using manual inputs 105. Alternatively, devices such as cellphones 120, in-room devices 121 wearable devices 124, and/or tablets/phablets 125 can be automatically registered using, for example, bar-code readers, radio-frequency identification (RFID) devices, wireless Internet, Bluetooth, etc. In at least one embodiment, a fixed display 123 (e.g., an information kiosk, or other fixed information display) can be located in the lobby of building 400 so that a user can register their personal handheld wireless devices with control system 150. In accordance with various embodiments, fixed display 123 can normally be used as an information/entertainment device which displays commercials, entertainment, or other content, but can be configured to operate as a fixed evacuation device when an emergency notification has been triggered by implementing evacuation agent program 130 onto fixed display 123. Alternatively, the content displayed on fixed display may be fed from a remote server. In this instance, evacuation agent program 130 will cause the remotely located fixed display 123 to display evacuation information when an emergency notification has been triggered. In accordance with various embodiments, user portable devices as described above as well as fixed displays 123 can also download an evacuation agent program 130 which is described in greater detail below. It is noted that in accordance with various embodiments, fixed displays 123 refers to devices which are not intended to be moved from the position at which they are located. For example, an otherwise portable device, such as a tablet computer, can be attached to a wall and implemented as a fixed, dynamically updated evacuation map using evacuation agent program 130 in accordance with various embodiments. Alternatively, an information kiosk which is not attached to a surface of building 400, but is otherwise too large to be considered a user portable device, can also download an evacuation agent program 130 in accordance with various embodiments.

In accordance with various embodiments, database 160 comprises a non-volatile data storage repository for storing real-time digital map 170 and other information described above which may be helpful to emergency responders. It noted that real-time digital map 170 can comprise many layers. For example, in one embodiment, real-time digital map 170 comprises a 2-dimensional (2-D) map of the building, or every floor of a building, being monitored and reported by system 100. Another layer comprising real-time digital map 170 may be a 3-dimensional (3-D) map of building 400. Other layers may comprise photographs, or other images, which are tied to particular locations within the selected environment. For example, an icon in the lobby of a 2-D map of real-time digital map 170 may be a link to one or more photographs of that location which provide emergency responders a better idea of the environment they are entering. For some buildings, an indication of how many people are expected to be on the premises at a given time of the day may be another layer of real-time digital map 170. This may be based upon historical information, or based upon the number of people who have been identified as having entered or exited the premises. In one embodiment, database 160 is located separate from the building which it is monitoring. Examples of database separate from the building which it is monitoring include, but are not limited to, a remotely located server, a cloud computing environment, and a distributed or networked, computing system. In various embodiments, a remotely located database 160 may be privately operated by the entity owning the building monitored and reported by system 100, may be operated by a third party provider, or may be operated by the local emergency services. In accordance with various embodiments, when an emergency is triggered, control system 150 can forward real-time digital map 170 to an emergency responder agent 180. In this instance, emergency responder agent 180 comprises a computing device as described above. In one embodiment, this comprises sending a web-link permitting the emergency responder agent 180 to access database 160 via control system 150. In at least one embodiment, control system 150 conveys an authorization (e.g., a user name and/or password) permitting emergency responder agent 180 to bypass control system 150 and access database 160 directly.

Emergency responder agent 180 can then download real-time digital map 170 and emergency responders can access it. In accordance with various embodiments, real-time digital map 170 comprises various layers of information including, but not limited to, a real-time 2-D and/or 3-D representation of a constructed environment such as building 400, images, etc. Additionally, as data is received by control system 150 via real-time environmental monitors 102 and/or position monitors 103, this information can be used to update in real-time the information available to emergency responder agent 180. In one embodiment, control system 150 will generate an updated real-time digital map 170 and convey this updated map to emergency responder agent 180. In another embodiment, control system 150 will update the real-time digital map 170 stored on database 160 which is then accessed by emergency responder agent 180. Alternatively, control system 150 can generate real-time updates 190 regarding building 400 based upon the information received from environmental monitors 102 and/or position monitors 103 and provide these real-time updates 190 to emergency responder agent 180 where they are used to update a locally accessed copy of real-time digital map 170. In other words, real-time updates 190 comprise real-time reports of various data including, but not limited to, environmental data within building 400, position information of people within building 400 based upon data received from cellphones 120, in-room devices 121, wearable devices 124, and/or tablets/phablets 125 detected by position monitors 103 based upon the location of cellphones 120, in-room devices 121, fixed displays 123, wearable devices 124, and/or tablets/phablets 125, and/or manually or verbally reported data received via manual inputs 105. In accordance with various embodiments, control system 150 can use a wireless communication interface to communicate wirelessly with emergency responder agent 180. Example wireless communication protocols described above with reference to position monitors 103 can be used for communication between control system 150 and emergency responder agent 180 in accordance with various embodiments. In accordance with various embodiments, this communication between control system 150 and emergency responder agent 180 facilitates generating real-time updates 190 of conditions in building 400 (e.g., from real-time environmental monitors 102 and position monitors 103) which permit identifying where and what type of emergency is occurring on the premises, and the location of people within building 400 who need to be evacuated based upon the location of cellphones 120, in-room devices 121, wearable devices 124, and/or tablets/phablets 125 detected by position monitors 103 based upon the location of cellphones 120, in-room devices 121, wearable devices 124, and/or tablets/phablets 125 detected by position monitors 103. This may include video feeds from video cameras disposed within building 400. Additionally, the emergency responders may access the wireless communication interface (e.g., 240 of FIG. 2) which facilitates communications between the emergency responders and cellphones 120, in-room devices 121, fixed displays 123, wearable devices 124, and/or tablets/phablets 125 within building 400. This gives emergency responders the ability to speak directly with people in building 400 to receive information from these people and to give evacuation instructions. In accordance with at least one embodiment, control system 150 can download a program (e.g., 131 of FIG. 1) onto emergency responder agent 180 which facilitates interfacing with control system 150 and/or database 160. Additionally, an evacuation agent program 130 resident on in-room devices 121 and/or fixed displays 123 facilitates interacting with control system 150 to permit downloading and/or updating a copy of real-time digital map 170 on in-room devices 121 and fixed displays 123, receiving updates on the position of in-room device 121, and updates of environmental conditions in building 400 reported and monitored by system 100. Control system 150 can also download evacuation agent program 130 onto a private device (e.g., a cellular telephone, wearable device 124, tablet/phablet 125, laptop computer, PDA, etc.) which permits interacting with control system 150 using a device which was not manufactured or originally intended to be used as an evacuation navigation device as will be discussed in greater detail below.

Alternatively, database 160 may be located within building 400 being monitored and reported by system 100. For example, database 160 may be implemented as a computer system located in a computer/server room of building 400. In another embodiment, database 160 comprises a removable data storage device, such as a removable hard drive or USB flash drive, which is located in a dedicated structure for access by emergency responders. As an example, a secured box outside of, but proximate to, building 400 being monitored and reported by system 100 may comprise a data and power connection for a removable hard drive comprising database 160. In normal circumstances, this box is secured from public access and permits updating of real-time digital map 170 while in the secured box. In the instance of an emergency, control system 150 is configured to provide physical access to the secured box to emergency responder agent 180. First, control system 150 can convey to an emergency responder agent 180, the location of the secured box in which database 160 resides. In this instance, emergency responder agent 180 is, for example, a firefighter who is responding to an emergency triggered by system 100. In one embodiment, control system 150 can remotely unlock the secured box in which database 160 is residing so that the firefighter can disconnect the removable hard disk comprising database 160 so that it can be accessed by an electronic device operated by the fire department. Alternatively, if the secured box is not equipped with an electronic lock, control system 150 can send a combination for unlocking the secured box, or the location at which a key for unlocking the secured box can be found. Alternatively, an emergency response agency such as the fire department may already have in their possession a key for unlocking the secured box. Thus, by securing the removable hard drive comprising database 160, the fire department now has access to an up-to-date representation of the configuration (e.g., real-time digital map 170) of building 400 and any other information stored on database 160 which is considered useful in responding to emergencies. Furthermore, the removable hard drive may provide information, such a web link, giving the firefighters Internet access to control system 150. This facilitates receiving real-time updates 190 of conditions in building 400 (e.g., from real-time environmental monitors 102 and position monitors 103) which permit identifying where and what type of emergency is occurring on the premises, and the location of people within building 400 who need to be evacuated based upon the location of cellphones 120 and in-room devices 121 detected by position monitors 103. This may include video feeds from video cameras disposed within building 400. Additionally, the emergency responders may access the wireless communication interface (e.g., 240 of FIG. 2) which facilitates communications between the emergency responders and cellphones 120 and in-room devices 121 within building 400. This gives emergency responders the ability to speak directly with people in building 400 to receive information from these people and to give evacuation instructions.

Figure 2:
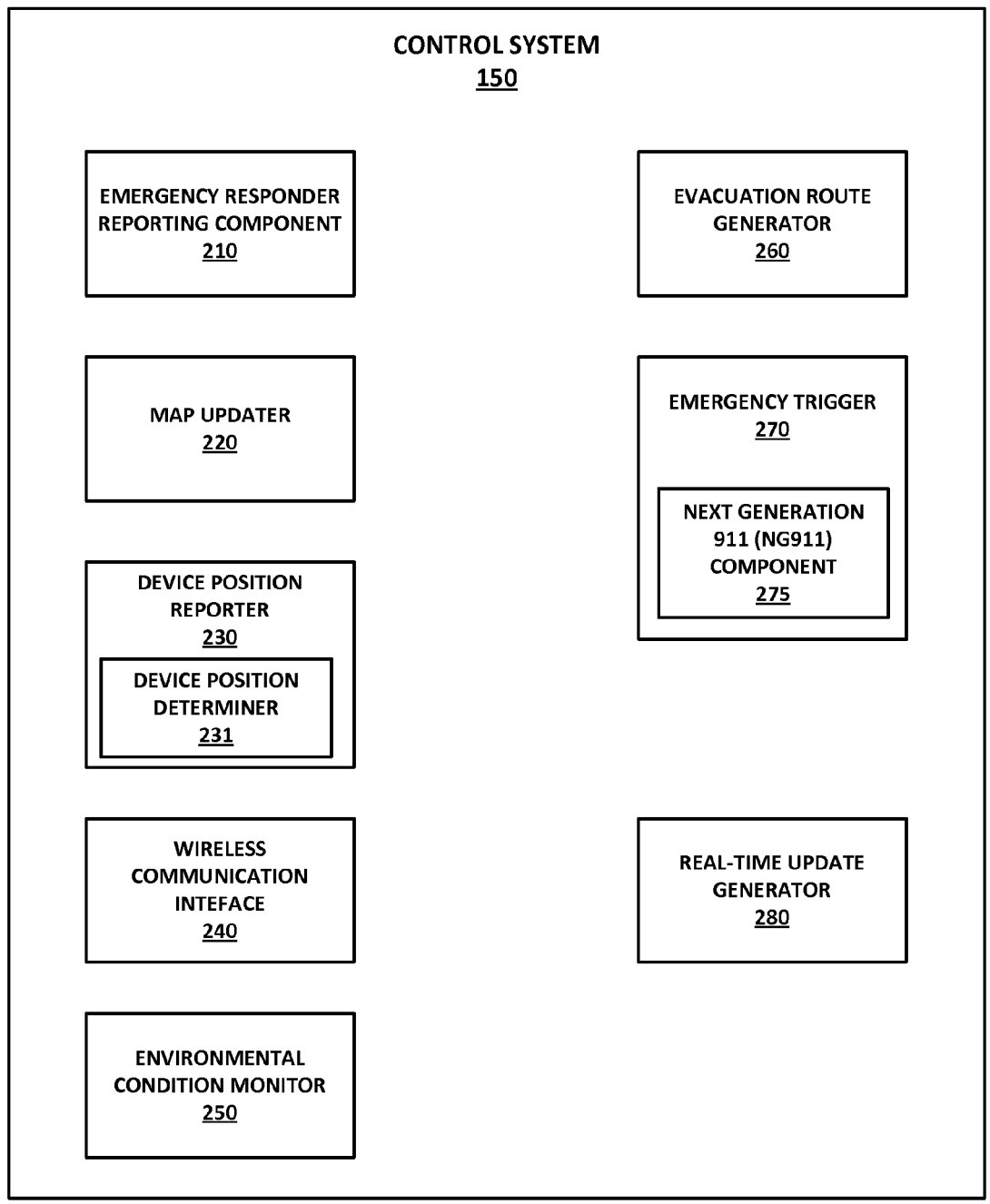
FIG. 2 is a diagram of components of an example control system in accordance with various embodiments.

FIG. 2 is a diagram of components of a control system 150 in accordance with various embodiments. In FIG. 2, control system 150 comprises an emergency responder reporting component 210. In accordance with various embodiments, emergency responder reporting component 210 is configured to provide an emergency responder agent access to real-time digital map 170. As described above, in accordance with various embodiments this comprises conveying a link to a webpage comprising real-time digital map 170. This may further comprise discreet messages which separately convey the link to the webpage as well as login information. In another embodiment, emergency responder reporting component 210 can download real-time digital map 170, and other information, directly to emergency responder agent 180. This can include downloading a program 131 onto emergency responder agent 180 which facilitates interfacing with control system 150 and/or database 160. In another embodiment, emergency responder reporting component 210 conveys the location of a secured box at which an emergency responder agent can access the removable hard drive, or other documents, regarding building 400 reported and monitored by system 100.

In FIG. 2, control system 150 also comprises a map updater 220. Map updater 220 is configured to receive information concerning changes to the physical topography of building 400 being reported and monitored by system 100. This can include the addition or removal of walls, modifications of walls (e.g., shortening or lengthening a wall), modifications to materials (e.g., replacing a fabric covering with paint), location of fixed, semi-fixed, or movable features such as furniture and/or equipment, addition or removal of flammable materials, as well as what type, location of fire-fighting apparatus, addition of sprinkler systems, etc.

In FIG. 2, control system 150 also comprises a device position reporter 230. As discussed above, in accordance with various embodiments, position monitors 103 are dispersed throughout building 400 being reported and monitored by system 100. These can autonomously detect the position of a handheld device or other user portable device such as cellphones 120, in-room devices 121, wearable devices 124, and/or tablets/phablets 125 and report the position of each of these devices to device position reporter 230. Alternatively, the handheld devices/user portable devices could autonomously determine their position using GNSS signals, cell tower triangulation, or detection of position monitors 103 which yield position information used to derive the position of the handheld/user portable device. In accordance with various embodiments, the determination of the position of the handheld/user portable device can be performed using device position determiner 231, or can be determined autonomously by the handheld/user portable device (e.g., cellphones 120, in-room devices 121, wearable devices 124, and/or tablets/phablets 125). In accordance with various embodiments, handheld/user portable devices such as cellphones 120, in-room devices 121, wearable devices 124, and/or tablets/phablets 125 operating evacuation agent program 130 will automatically report into control system 150 when the device has reached a designated evacuation position. Alternatively, a position monitor 103 located at an evacuation position can report this information to device position reporter 230 without the necessity of an operation performed by the handheld/user portable device. This facilitates creating a roll of people safely evacuated from building 400 for emergency responders. This can be checked against a roll of people thought to be in building 400 to help emergency responders determine whether people still need to be rescued or evacuated from building 400.

In FIG. 2, wireless communication interface 240 is configured to facilitate two-way communications between handheld/user portable devices (e.g., cellphones 120, in-room devices 121, wearable devices 124, and/or tablets/phablets 125) and other entities. This can include emergency responder agent(s) 180, employees at building 400 who may be able to provide needed information, or others such as emergency dispatchers. This provides the ability to exchange information which is needed to safely evacuate building 400 during an emergency, or for reporting information such as conditions at a location, or location reporting of a user of one of the handheld/user portable devices. In accordance with various embodiments, wireless communication interface 240 can provide, as an example, Voice over Internet Protocol (VoIP) functionality including, but not limited to, Short Message Service (SMS), voice, voice messaging, etc. over the Internet rather than the Public Switched Telephone Network.

In FIG. 2, environmental condition monitor 250 is configured to monitor information sent from real-time environmental monitors 102. In accordance with various embodiments, this provides the ability to detect dangerous conditions such as fires, toxic fumes, radiation, gas leaks, etc. and report them to control system 150. In response, emergency trigger 270 can automatically trigger an emergency notification to emergency responder services. Alternatively, emergency trigger 270 can be manually triggered as well. After an emergency has been triggered, environmental condition monitor 250 can continue receiving information from real-time environmental monitors 102 to facilitate generating evacuation routes for users of handheld devices such as cellphones 120, in-room devices 121, wearable devices 124, and/or tablets/phablets 125. For example, if a fire blocks a pre-determined evacuation route from a building, control system 150 will receive this information via environmental condition monitor 250 and dynamically generate a new evacuation route (e.g., as an update 190 of FIG. 1) for a given location using evacuation route generator 260. It is noted that the evacuation routes for devices such as cellphones 120, in-room devices 121, wearable devices 124, and/or tablets/phablets 125 may also be sent to emergency responder agent 180 so that emergency responders know which routes within building 400 are likely to be used during an evacuation. Additionally, as evacuation routes may be dynamically updated or changed, these changes to evacuation routes will be reported to emergency responder agents 180 in the form of updates 190. In accordance with various embodiments, emergency trigger 270 can report emergency notifications to emergency responder agent 180 in a variety of ways. In one embodiment, emergency trigger 270 can simply send an alarm (e.g., a fire alarm) automatically to the appropriate agency (e.g., a 911 call center, the fire department, etc.) when an emergency condition is identified. In another embodiment, emergency trigger 270 can implement the text-to-911 standard which is being implemented in various regions. Alternatively, emergency trigger 270 can generate a code indicating to the 911 call center that the emergency notification is a machine generated notification of an emergency event. It is noted that the machine generated notification can be routed to other emergency responder agents and agencies in addition to, or instead of, the 911 call center. In accordance with various embodiments, in response to machine generated notification, the 911 call center, or other emergency responder agents/agencies, will initiate a verification request to a person designated as a local agent for emergency response activities. As an example, the cellphone number of the designated local agent can be retained by the 911 call center, or other emergency responder agents/agencies, and in response to a machine generated emergency notification, the cellphone of the designated local agent can be called to verify that there is in fact an emergency at the selected location. In accordance with various embodiments, the local agent can provide a code which is registered with the 911 call center, or other emergency responder agents/agencies, which verifies the identity of the local agent and/or authority to verify an emergency notification.

In accordance with various embodiments, emergency trigger 270 further comprises a next generation 911 (NG911) component 275. NG911 component 275 is configured to comply with the standards and protocols of the re-designed emergency calling system which is the emerging worldwide standard. In the past, ad hoc solutions were used to integrate new technologies into the 911 system. In other words, as cellular technology, VoIP, and other communication methods have been more widely used, new solutions had to be added onto the existing 911 system to permit locating the caller to the 911 call center. It has been recognized that this system is in need of an overhaul in order to meet the needs of the communication networks now being used. The NG911 system has been to be compatible with digital communications both in the United States and abroad and is based upon the standard Session Initiation Protocol (SIP) which is common to VoIP services and 4G mobile networks and can be used for controlling multimedia communication sessions. SIP defines the data messages that are sent to begin and end calls, as well as other data used to initiate calling features such as Caller ID and call forwarding. Using the NG911 system, a caller device (e.g., a cellphone, or computer using VoIP) first obtains its position from an access network such as an Internet provider or cellular provider. The position information is then sent over an origination network using emergency call packets to identify that the call is an emergency call. Using the position information for the calling device, the emergency call is then routed to the appropriate emergency communication center. Among the features supported by the NG911 system is the ability to stream data such as real-time video and voice. In accordance with various embodiments, control system 150 is configured to provide the position information in the emergency call (e.g., the address of building 400) and can add finer granularity in locating each device (e.g., what floor, hallway, room, etc.) at which each registered device is located within, or proximate to, building 400.

Evacuation route generator 260 is configured to generate an evacuation route for any given location within building 400 based upon pre-determined evacuation planning in conjunction with real-time conditions within building 400. For example, public buildings are equipped with pre-determined maps of evacuation routes which typically show a user's current location and a route to be followed to an emergency exit. However, these maps do not account for real-time conditions which may not be foreseen when the maps are created. As an example, if fire blocks one of the pre-determined emergency routes shown on the map, user's will neither receive timely information of this obstruction, nor will they receive an updated emergency route to safely direct the user to an emergency exit. In accordance with various embodiments, evacuation route generator 260 receives information on real-time environmental conditions from environmental condition monitor 250, and user position information from device position reporter 230 in order to dynamically generate new evacuation routes when necessary due to changing conditions. This includes not only handheld/user portable devices, but fixed display devices 123 such as kiosks and/or wall-mounted displays which can display dynamically generated new evacuation routes.

In FIG. 2, real-time update generator 280 is configured to update, in real-time, conditions within building 400. As an example, real-time update generator 280 can generate updates to real-time digital map 170 which show the location of each handheld/user portable device (e.g., cellphones 120, in-room devices 121, wearable devices 124, and/or tablets/phablets 125) and thus the location of their respective users. Real-time update generator 280 can further generate updates to digital map 170, or to another file in database 160, which provides details of the type and location of the event which triggered an emergency response. As an example, real-time update generator 280 can report a fire at location 401 of building 400. Alternatively, rather than update real-time digital map 170, real-time update generator 280 can simply generate updates 190 which go directly to emergency responder agents 180 and/or handheld/user portable devices such as cellphones 120, in-room devices 121, wearable devices 124, and/or tablets/phablets 125. The update(s) 190 are then applied to the real-time digital map 170 resident upon the device being used.

Example Computer System Environment

Figure 3:
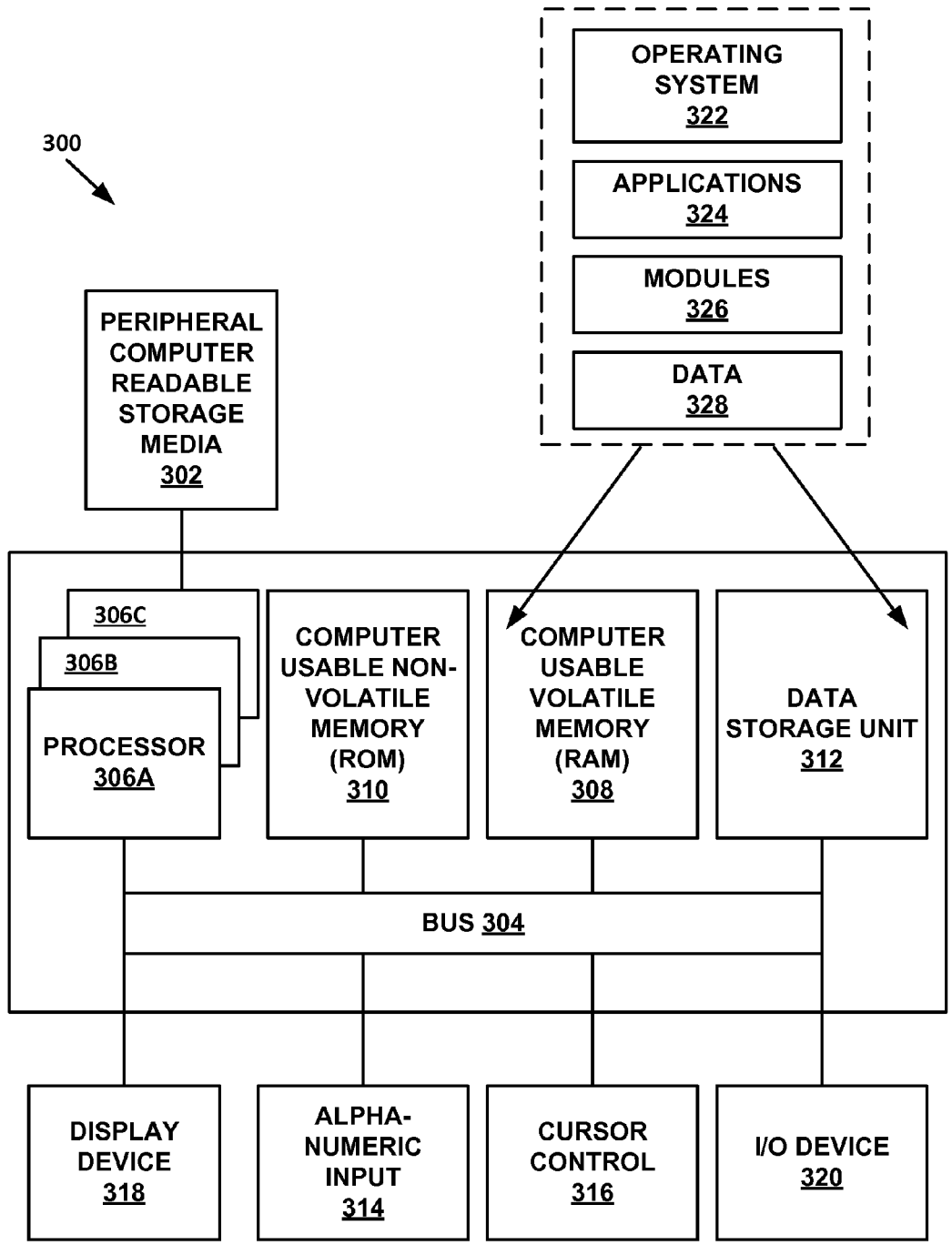
FIG. 3 is a diagram of components of an example computer system used in accordance with various embodiments.

With reference now to FIG. 3, all or portions of some embodiments described herein are composed of computer-readable and computer-executable instructions that reside, for example, in computer-usable/computer-readable storage media of a computer system. That is, FIG. 3 illustrates one example of a type of computer (computer system 300) that can be used in accordance with or to implement various embodiments which are discussed herein. It is appreciated that computer system 300 of FIG. 3 is only an example and that embodiments as described herein can operate on or within a number of different computer systems including, but not limited to, general purpose networked computer systems, embedded computer systems, server devices, various intermediate devices/nodes, stand-alone computer systems, handheld computer systems, tablet/phablet computer systems, multi-media devices, wearable devices, and the like. Computer system 300 of FIG. 3 is well adapted to having peripheral computer-readable storage media 302 such as, for example, a floppy disk, a compact disc, digital versatile disc, universal serial bus "thumb" drive, removable memory card, and the like coupled thereto.

System 300 of FIG. 3 includes an address/data bus 304 for communicating information, and a processor 306A coupled to bus 304 for processing information and instructions. As depicted in FIG. 3, system 300 is also well suited to a multi-processor environment in which a plurality of processors 306A, 306B, and 306C are present. Conversely, system 300 is also well suited to having a single processor such as, for example, processor 306A. Processors 306A, 306B, and 306C may be any of various types of microprocessors. System 300 also includes data storage features such as a computer usable volatile memory 308, e.g., random access memory (RAM), coupled to bus 304 for storing information and instructions (e.g., control system 150 of FIG. 1) for processors 306A, 306B, and 306C. System 300 also includes computer usable non-volatile memory 310, e.g., read only memory (ROM), coupled to bus 304 for storing static information and instructions for processors 306A, 306B, and 306C. Also present in system 300 is a data storage unit 312 (e.g., a magnetic or optical disk and disk drive) coupled to bus 304 for storing information and instructions (e.g., database 160 of FIG. 1). System 300 also includes an optional alphanumeric input device 314 including alphanumeric and function keys coupled to bus 304 for communicating information and command selections to processor 306A or processors 306A, 306B, and 306C. System 300 also includes an optional cursor control device 316 coupled to bus 304 for communicating user input information and command selections to processor 306A or processors 306A, 306B, and 306C. In one embodiment, system 300 also includes an optional display device 318 coupled to bus 304 for displaying information.

Referring still to FIG. 3, optional display device 318 of FIG. 3 may be a liquid crystal device, cathode ray tube, plasma display device or other display device suitable for creating graphic images and alphanumeric characters recognizable to a user. Optional cursor control device 316 allows the computer user to dynamically signal the movement of a visible symbol (cursor) on a display screen of display device 318 and indicate user selections of selectable items displayed on display device 318. Many implementations of cursor control device 316 are known in the art including a trackball, mouse, touch pad, joystick or special keys on alphanumeric input device 314 capable of signaling movement of a given direction or manner of displacement. Alternatively, it will be appreciated that a cursor can be directed and/or activated via input from alphanumeric input device 314 using special keys and key sequence commands. System 300 is also well suited to having a cursor directed by other means such as, for example, voice commands. System 300 also includes an I/O device 320 for coupling system 300 with external entities. For example, in one embodiment, I/O device 320 is a modem for enabling wired or wireless communications between system 300 and an external network such as, but not limited to, the Internet.

Referring still to FIG. 3, various other components are depicted for system 300. Specifically, when present, an operating system 322, applications 324 (e.g., control system 150), modules 326, and data 328 are shown as typically residing in one or some combination of computer usable volatile memory 308 (e.g., RAM), computer usable non-volatile memory 310 (e.g., ROM), and data storage unit 312. In some embodiments, all or portions of various embodiments described herein are stored, for example, as an application 324 and/or module 326 in memory locations within RAM 308, computer-readable storage media within data storage unit 312, peripheral computer-readable storage media 302, and/or other tangible computer-readable storage media.

Figure 4:
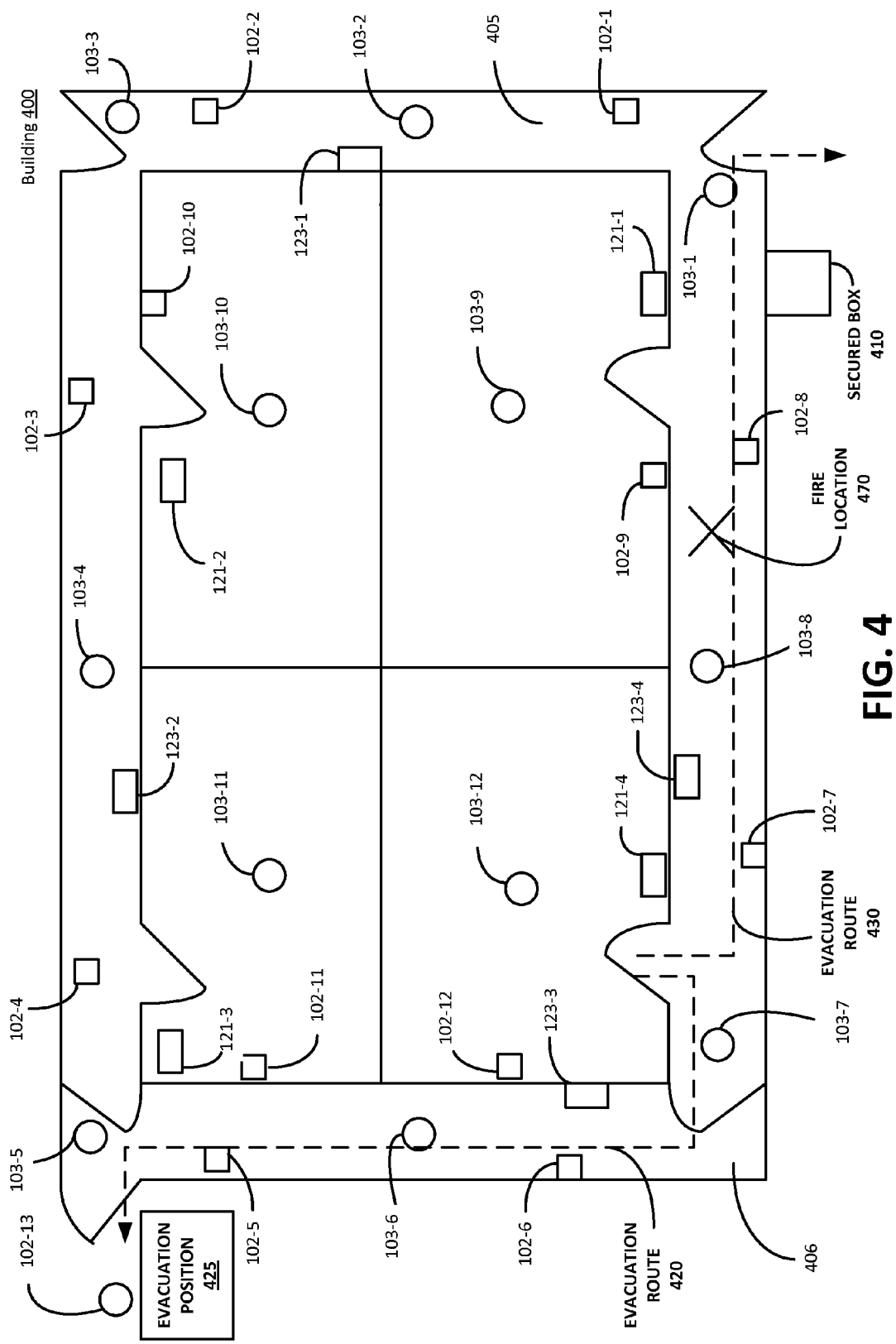
FIG. 4 shows an example building equipped with a reporting and monitoring system in accordance with various embodiments.

FIG. 4 shows an example building 400 equipped with a reporting and monitoring system in accordance with various embodiments. In FIG. 4, building 400 comprises rooms 401, 402, 403, and 404 which are linked by a perimeter hallway 405. Also shown in FIG. 4 are a plurality of real-time environmental monitors (e.g., 102-1-102-8) which are disposed at various locations of perimeter hallway 405 and a service area 406 which is not normally accessible to the public. Real-time environmental monitors 102-9, 102-10, 102-11, and 102-12 are located within rooms 401, 402, 402, and 404 respectively. Also shown in FIG. 4, are a plurality of position monitors (e.g., 103-1-103-8) which are disposed at various location of perimeter hallway 405 and service area 406. Position monitors 103-9, 103-10, 103-11, and 103-12 are located within rooms 401, 402, 402, and 404 respectively. Fixed displays 123-1, 123-2, and 123-3 are disposed in perimeter hallway 405 while fixed display 123-4 is disposed in service area 406. In FIG. 4, secured box 410 comprises a secure location at which a removable hard drive (not shown) is located and upon which database 160, or a copy thereof, is stored. It is noted that in accordance with various embodiments, real-time environmental monitors 102 can monitor one or more conditions within building 400 using smoke monitors, heat monitors, gas monitors (e.g., CO, $CO_2$, monitors, natural gas monitors, radon monitors, toxic fume monitors, etc.), light monitors, radiation monitors, earthquake monitors, cameras (e.g., video cameras, infra-red cameras, thermal imagers, light intensifying cameras, etc.) or a combination thereof. In accordance with various embodiments, the location of each real-time environmental monitor 102 is recorded within real-time digital map 170. Furthermore, the location of each of position monitors 103 is similarly recorded within real-time digital map 170. In at least one embodiment, the functionality of a real-time environmental monitor 102 and a position monitor 103 can be implemented in the same device.

As an example, a fire 450 is detected by one or more of real-time environmental monitors 102-3, 102-4, 102-5, and 102-6. This is reported to environmental condition monitor 250 of control system 150 which automatically triggers an emergency notification to the fire department. It is noted that control system 150 may be located in a different part of building 400 (e.g., in room 401), or at a remote location operated by a third party or the emergency responders of the community in which building 400 is located. In the present example, as database 160 is located in a removable hard drive (not shown) located in secured box 410, the location of secured box 410 is conveyed to emergency responder agent 180. As described above, emergency responders may access secured box 410 using, for example, a fireman's key, or a combination which is conveyed along with the location of secured box 410 to emergency responder agent 180 when the emergency notification is triggered. Alternatively, control system 150 may remotely unlock secured box 410, or convey to emergency responder agent 180 the location at which keys are stored which can be used to unlock secured box 410. Upon gaining access to database 160, emergency responders can view real-time digital map 170 of building 400. In so doing, real-time digital map 170 will display the most recent internal configuration of building 400 on record. Real-time digital map 170 will also display information from one or more of real-time environmental monitors 102-3, 102-4, 102-5, and 102-6 which will help emergency responders to determine the type and location of the event which triggered an emergency notification. Using position monitors 103, emergency responders will also be able to determine the location within building 400 at which in-room devices 121-1, 121-2, 121-3, and 121-4 are located, as well as any cellphones 120 (e.g., cellphone 120-1 located in room 401), wearable devices 124, and/or tablet/phablets 125, or similar devices, within building 400 which have downloaded evacuation agent program 130. In one embodiment, even if a user does not register their private device for downloading evacuation agent program 130 onto the device, position monitors 103 can detect that a device of some sort, even though not registered with control system 150, is in building 400. For example, if the user's private device interacts with a Bluetooth device, Wi-Fi router, or RFID reader (e.g., position monitors 103) within building 400 this indicates that an anonymous user is in the building and provide some position information which can be used by emergency responders in determining whether building 400 is still occupied and some information regarding that person's location. Additionally, evacuation routes displayed on real-time digital map 170 will be shown on fixed displays 123-1, 123-2, 123-3, and 123-4 when an emergency notification is triggered. In one embodiment, in-room devices 121 will generate a signal to control system 150 when they are removed from a docking station, thus indicating that a user has picked up that device in response to an emergency notification. In accordance with various embodiments, this can be a signal to control system 150 to trigger an emergency notification to emergency responder agent 180 as well as triggering localized emergency notifications within building 400 including, but not limited to, registered devices (e.g., cellphones 120, in-room devices 121, fixed displays 123, wearable devices 124, and/or tablet/phablets 125) and other alarms. In various embodiments, this can include verification (e.g., in person, using real-time environmental monitors 102, and/or speaking with the user via in-room device 121). In accordance with various embodiments, a user's personal device (e.g., cellphones 120, wearable devices 124, and tablets/phablets 125) may display an icon for triggering evacuation agent program 130. As an example, when a user activates the icon for evacuation agent program 130, this will initiate triggering an emergency notification as described above. In accordance with various embodiments, this triggering of an emergency notification by a user's personal device is performed via short-range communication networks (e.g., Wi-Fi routers, Bluetooth components, or other short-range wireless communication devices) and cannot be triggered using a cellular communication network. This is to prevent a user from accidentally initiating the triggering of an emergency notification for building 400 when the user is no longer in the vicinity of building 400. For example, a guest at a hotel may forget to delete evacuation agent program 130 after they have checked out of the hotel. In order to prevent the user from inadvertently triggering an emergency notification, this feature is performed from a user's personal device using short-range communication networks. In a similar manner, a person in building 400 can initiate triggering an emergency notification via the evacuation agent program 130 resident upon a fixed display 123 (e.g., wall-mounted evacuation displays or information kiosks) located within building 400.

This information can also be used by control system 150 to report the location of people within building 400, as part of the real-time updates 190 of real-time digital map 170, sent to emergency responder agent 180. For example, if people in rooms 401 and 402 pickup in-room devices 121-1 and 121-4 respectively in response to the triggering of an emergency notification, this indicates to control system 150 that people are at the location of those devices as reported by position monitors 103. In various embodiments, this can include verification (e.g., in person, using real-time environmental monitors 102, and/or speaking with the user via in-room device 121). Additionally, as neither of in-room devices 121-2 and 121-3 were picked up, this indicates to control system 150 that people may not be in those locations. Additionally, the location of a user of cellphone 120-1 in room 401 will be reported in real-time digital map 170 to emergency responder agent 180.

FIG. 5 is a flowchart of a method of implementing a responder-ready reporting network in accordance with various embodiments. In operation 510 of FIG. 5, a real-time digital map of a selected environment is managed using a control system implemented by a processor. As described above, the real-time digital map 170 comprises the most up to date 2-D, and possibly 3-D as well, representation of the physical configuration of a selected environment (e.g., building 400 of FIG. 4) including the location of walls, doors, stairwells, rooms, partitions, emergency equipment, toxic/volatile materials, construction materials, etc. Furthermore, the real-time digital map 170 comprises real-time position location information regarding handheld devices (e.g., cellphones 120, in-room devices 121, wearable devices 124, and/or tablet/phablets 125) which may indicate the location of a user of those devices. As described above, in various embodiments the selected environment comprises a constructed environment having a network of environmental monitors 102 and position monitors 103 embedded therein. In accordance with various embodiments, as additional information is received and processed by control system 150 (e.g., from environmental monitors 102 and/or position monitors 103), control system 150 can generate updates (e.g., 190 of FIG. 1) to the real-time digital map accessed by emergency responder agent 180, or newly updated real-time digital maps 170 can be generated based upon received reports (e.g., environmental data from real-time environmental monitors 102, position data from position monitors 103, and/or updates 190 received from cellphones 120, in-room devices 121, fixed displays 123, wearable devices 124, and/or tablets/phablets 125). These real-time updates/updated maps are sent to cellphones 120, in-room devices 121, and emergency responder agents 180.

In operation 520 of FIG. 5, the real-time digital map of the selected environment is stored using a data storage repository coupled with the control system. As described above, real-time digital map 170 is stored on database 160 which can be located at the selected environment, or remote from it. Furthermore, database 160 can be operated by a third-party provider, an owner/operator of the selected environment, or by an emergency services agency. In at least one embodiment, a secured box (e.g., 410 of FIG. 4) at the premises of building 400 stores a removable data storage device (e.g., a hard disk drive, USB drive, etc.) comprising database 160 and real-time digital map 170 and other data (e.g., a web-link to database 160, user identification and password) which may be useful to emergency responder services. In accordance with various embodiments, the real-time digital map 170 is a 2-D map of the selected environment. Additionally, in accordance with various embodiments, real-time digital map 170 comprises a 3-D map of the selected environment as well as the 2-D map described above.

In operation 530 of FIG. 5, data regarding the selected environment, including the real-time digital map, is conveyed to an emergency responder agent in response to the triggering of an emergency notification regarding the selected environment using an emergency responder reporting component (e.g., 210 of FIG. 2) implemented by the processor. In accordance with various embodiments, this includes conveying an authorization (e.g., a web link, user name, and password) to remotely access the data storage repository by an emergency responder agent. In another embodiment, control system 150 actually sends the data including real-time digital map 170 to an emergency responder agent. In another embodiment, control system 150 provides physical access to the data storage repository. This can include, but is not limited to, providing the location and instructions such as lock combinations or the location of keys used for opening a secured box 410. Alternatively, control system 150 can be configured to remotely unlock and electronic locking mechanism of secured box 410 for emergency responders. Additionally, control system 150 comprises a wireless communication interface (e.g., 240 of FIG. 2) which is configured to provide real-time communication between emergency responder agents and handheld wireless devices (e.g., cellphones 120 and/or in-room devices 121).

Evacuation Navigation Device

Figure 6:
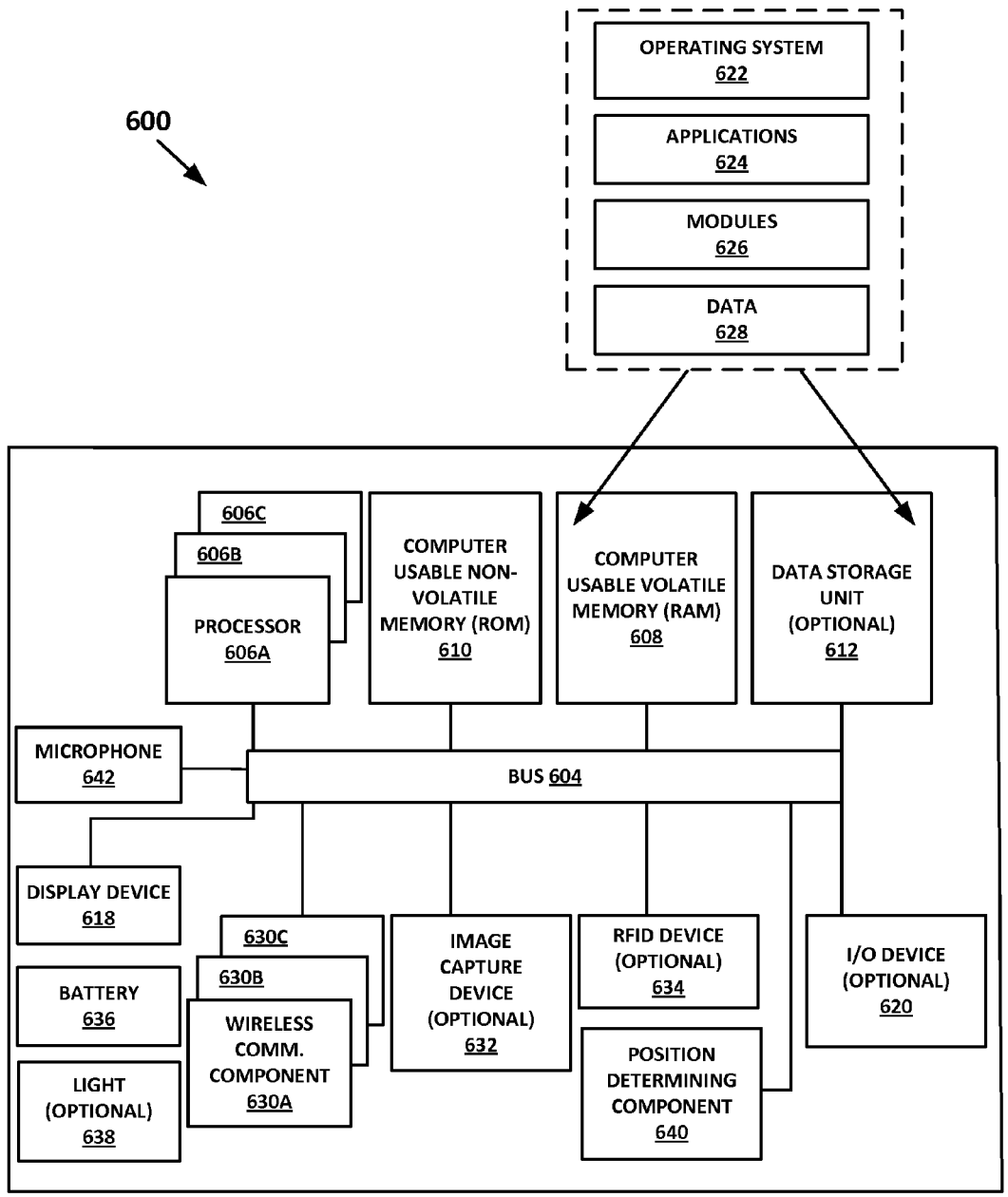
FIG. 6 is a diagram of components of handheld wireless device in accordance with various embodiments.

FIG. 6 is a diagram of components of handheld wireless device 600 in accordance with various embodiments. With reference now to FIG. 6, portions of some embodiments described herein are composed of computer-readable and computer-executable instructions that reside, for example, in computer-usable/computer-readable storage media of a handheld wireless device. That is, FIG. 6 illustrates one example of a type of handheld wireless device 600 (e.g., cellphone 120, in-room device 121, wearable devices 124, and/or tablet/phablets 125 of FIG. 1) that can be used in accordance with or to implement various embodiments of an evacuation navigation device which are discussed herein. It is appreciated that handheld wireless device 600 of FIG. 6 is only an example and that embodiments as described herein can operate on or within a number of different handheld wireless devices including, but not limited to, cellphones, tablet computer systems, laptop computer systems, multi-media devices, evacuation navigation devices (e.g., in-room device 121 of FIG. 1), wearable devices, and the like. It is noted that in accordance with various embodiments, an evacuation navigation device can be specifically built for that purpose alone (e.g., in-room devices 121), or adapted for that purpose by downloading evacuation agent program 130 onto a user's personal device (e.g., cellphones 120, wearable devices 124, and/or tablet/phablets 125, laptop computer, PDA, etc.).

Handheld wireless device 600 of FIG. 6 includes an address/data bus 604 for communicating information, and a processor 606A coupled to bus 604 for processing information and instructions. As depicted in FIG. 6, handheld wireless device 600 is also well suited to a multi-processor environment in which a plurality of processors 606A, 606B, and 606C are present. Conversely, handheld wireless device 600 is also well suited to having a single processor such as, for example, processor 606A. Processors 606A, 606B, and 606C may be any of various types of microprocessors. Handheld wireless device 600 also includes data storage features such as a computer usable volatile memory 608, e.g., random access memory (RAM), coupled to bus 604 for storing information and instructions (e.g., evacuation agent program of FIG. 1) for processors 606A, 606B, and 606C. Handheld wireless device 600 also includes computer usable non-volatile memory 610, e.g., read only memory (ROM), coupled to bus 604 for storing static information and instructions for processors 606A, 606B, and 606C. Also present in handheld wireless device 600 is an optional data storage unit 612 (e.g., a magnetic or optical disk and disk drive) coupled to bus 604 for storing information and instructions (e.g., database 160 of FIG. 1). Handheld wireless device 600 also includes an optional alphanumeric input device 614 including alphanumeric and function keys coupled to bus 604 for communicating information and command selections to processor 606A or processors 606A, 606B, and 606C. Handheld wireless device 600 also includes an optional cursor control device 616 coupled to bus 604 for communicating user input information and command selections to processor 606A or processors 606A, 606B, and 606C. In one embodiment, handheld wireless device 600 also includes a display device 618 coupled to bus 604 for displaying information. Referring still to FIG. 6, optional display device 618 of FIG. 6 may be a liquid crystal device, plasma display device or other display device suitable for creating graphic images and alphanumeric characters recognizable to a user. In accordance with at least one embodiment, display device 618 comprises a touch screen device which permits a user to input data and commands to processor (s) 608. Handheld wireless device 600 also includes an optional I/O device 620 for coupling handheld wireless device 600 with external entities. For example, in one embodiment, I/O device 620 is a modem for enabling wired or wireless communications between handheld wireless device 600 and an external network such as, but not limited to, the Internet. More specifically, in various embodiments, I/O device 620 can be used to couple handheld wireless device with control system 150 to facilitate receiving real-time digital map 170.

Referring still to FIG. 6, various other components are depicted for handheld wireless device 600. Specifically, when present, an operating system 622, applications 624 (e.g., evacuation agent program 130), modules 626, and data 628 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations within RAM 608, computer-readable storage media within data storage unit 612, peripheral computer-readable storage media 602, and/or other tangible computer-readable storage media.

In accordance with various embodiments, at least one wireless communication component (e.g., 630A of FIG. 6) is coupled with bus 604. A wireless communication component 630, in some embodiments, comprises a transceiver that can communicate with embedded position monitors 103. It is noted that a plurality of wireless communication components (e.g., 630A, 630B, and 630C of FIG. 6) can be disposed within handheld wireless device 600 in accordance with various embodiments. Examples of wireless communication components 630 which can be used in accordance with various embodiments include, but are not limited to, cellular transceivers, wireless networking transceivers, radio transceivers, etc. Examples of cellular networks used by wireless communication components 630 include, but are not limited to GSM cellular networks, GPRS cellular networks, GDMA cellular networks, and EDGE cellular networks. In accordance with at least one embodiment, wireless communication component 630 is configured to operate on a satellite-based cellular network such as the Inmarsat or Iridium communication networks. Other examples of wireless communication component 630 used in accordance with various embodiments include, but are not limited to, Wi-Fi, WiMAX, implementations of the IEEE 802.11 standard, implementations of the IEEE 802.15.4 standard for personal area networks, and a short range wireless connection operating in the Instrument Scientific and Medical (ISM) band of the radio frequency spectrum in the 2400-2484 MHz range (e.g., implementations of the Bluetooth® standard) including Bluetooth Low Energy (BLE) implementations, implementations of the IEEE 1902.1 (RuBee) standard, implementations of IEEE 802.15 (ZigBee) standard, etc.

In FIG. 6, handheld wireless device 600 further comprises an optional image capture device 632. Examples of image capture device 632 include a camera, a video camera, a digital camera, a digital video camera, a digital camcorder, etc. In at least one embodiment, image capture device 632 is configured for low visibility conditions such as darkness, smoke, fog, etc. and can include, but is not limited to, image intensifiers, charge coupled devices (CCD) including intensified CCD (ICCD) devices, complimentary metal-oxide semiconductor (CMOS) devices including intensified CMOS (ICMOS) devices, hybrid photodiode devices, thermal imagers, and near-infrared illumination devices. In accordance with at least one embodiment, images captured by image capture device 632 can be displayed on display device 618 as an aid in navigating through areas in which visibility is degraded.

In FIG. 6, handheld wireless device 600 further comprises an optional radio-frequency identification (RFID) device 634. In various embodiments, RFID device 634 comprises an RFID tag or an RFID transceiver which can be used to facilitate the identification of, and position determination, of handheld wireless device 600. For example, if RFID device 634 comprises an RFID tag, an RFID transceiver (e.g., a position monitor 103 of FIG. 1) can detect and identify handheld wireless device 600 by detecting and identifying RFID tag 634. Alternatively, if RFID device 634 comprises an RFID transceiver, handheld wireless device 600 can autonomously determine its location by detecting and identifying RFID tags which are disposed within a selected area such as building 400.

In FIG. 6, handheld wireless device 600 further comprises a battery 636 for providing power to handheld wireless device 600 and an optional light 638. Light 638 is for providing illumination to facilitate navigating an evacuation route. Light 638 can provide light in the visible light portion of the electro-magnetic spectrum, or in another portion of the electro-magnetic spectrum such as the near-infrared to be used in conjunction with a near-infrared image capture device 632 described above.

In FIG. 6, handheld wireless device 600 further comprises a position determining component 640. In accordance with various embodiments, comprises hardware and/or processing logic for determining the location of handheld wireless device 600. In accordance with various embodiments, position determining component 640 comprises a Global Navigation Satellite System (GNSS) receiver and/or other component configured to determine the location of handheld wireless device 600 from external radio signals. It is noted that the functionality of position determining component 640 may be implemented by processor(s) 606A, 606B, and 606C. Furthermore, it is noted that determination of the position of handheld wireless device 600 may be determined by detecting the proximity to known features such as position monitors 103 by handheld wireless device 600, or by monitoring the position of handheld wireless device 600 by control system 150. That is, positioning component 640, in some embodiments, utilizes Wi-Fi, Bluetooth, RFID, and/or other wireless signals for from a position monitors 103 in a positioning system embedded in a constructed environment to perform position determination. In some embodiments, the positioning component 640 includes its own transceiver for communicating with position monitors 103, while in other embodiments, positioning component 640 relies on wireless communication component 630 for such communication. In one embodiment, handheld wireless device 600 can capture images of the interior of building 400 and compare these images with a database of images using photogrammetric techniques to determine its position within building 400. In one embodiment, control system 150 can monitor the location of handheld wireless device 600 and send that location information to handheld wireless device 600 for display on display device 618. In FIG. 6, handheld wireless device 600 further comprises a microphone 642 coupled with bus 604 to facilitate communicating with emergency responders, or other entities, who are involved in responding to an emergency at building 400.

In the example shown in FIG. 4, each of rooms 401, 402, 403, and 404 are equipped with an in-room device 121 (e.g., 121-1, 121-2, 121-3, and 121-4 respectively). In accordance with various embodiments, in room devices 121 are positioned in a docking station (not shown) which provides power to the in-room device 121 as well as a data connection with control system 150. Alternatively, in-room device may simply be equipped with a battery and have a pre-loaded version of digital building plans for building 400, or a downloaded copy of real-time digital map 170, stored thereon. In another embodiment, a copy of real-time digital map 170 is automatically downloaded onto in-room device 121 when an emergency notification is triggered. In the embodiment shown in FIG. 4, a default evacuation route 420 has been identified for room 403. In this case, in-room device 121-3 will display a copy of real-time digital map 170 showing building 400 in addition to evacuation route 420 which will direct a user of in-room device 121-3 to an evacuation position 425.

Similarly, a guest or visitor to building 400 can register their private device such as a cellphone 120, a wearable device 124, and/or tablet/phablet 125, laptop computer, PDA, etc. They can then download evacuation agent program 130 onto their device (e.g., at the registration desk, by receiving a web link for downloading evacuation agent program 130, at a kiosk in the lobby, etc.). In so doing, their device will be registered with control system 150 and, if an emergency notification is triggered, be alerted by control system, download real-time digital map 170 (e.g., a 2-D map of building 400 as well as a 3-D map of building 400 in accordance with various embodiments), and receive real-time updates 190 of the conditions within building 400. This includes evacuation routes within building 400. In accordance with various embodiments, control system 150 can receive information from position monitors 103 as a user of cellphone 120 moves throughout building 400 and continuously determine whether to generate a new evacuation route for that device based upon its position in building 400.

In the following discussion, the term "handheld wireless device 600" will refer to either of specifically built evacuation navigation devices, or handheld wireless devices (e.g., cellphones 120, tablet computers, wearable devices 124, and/or tablet/phablets 125, laptop computers, PDAs, or other personal devices, which have been adapted to the purpose of evacuation navigation devices by downloading evacuation agent program 130 onto that device. Referring again to FIG. 4, when an emergency notification regarding building 400 has been triggered, control system 150 will generate a notification to each handheld wireless device 600 registered on the premises of building 400. In other words, each cellphone 120 having a copy of evacuation agent program 130 resident thereon will receive a message indicating that an emergency notification has been triggered. In at least one embodiment, the user of cellphone 120 will be notified using the ringtone, buzzer, or other signals configured for that device until a user manually responds. This helps to ensure that the user has been notified of the emergency. In one embodiment, when the user manually responds, this response is noted by control system 150 and indicates the presence and identity of a user within building 400.

Similarly, each in-room device 121 resident within building 400 will receive a message indicating that an emergency notification has been triggered. In this instance, when a user removes in-room device 121 from a docking station or cradle, a notification can be sent to control system 150 which reports the location and identification of that particular in-room device 121. In accordance with various embodiments, in-room device 121 can be activated remotely when control system 150 triggers and emergency notification, or when it is picked up by a user. It is noted that handheld wireless devices 600 registered with a particular location can be proximate, but not within, a selected area.

In one embodiment, when an emergency notification has been triggered, control system 150 will automatically download a copy of real-time digital map 170 (e.g., a 2-D map and/or 3-D map) onto each registered handheld wireless device 600 having evacuation agent program loaded thereon. Alternatively, a copy of real-time digital map 170 can be downloaded onto each registered handheld wireless device 600 as part of the process of downloading evacuation agent program onto that device. In this instance, the handheld wireless device 600 can perform autonomously to determine its location within building 400. In accordance with one embodiment, the handheld wireless device 600 can also, using evacuation agent program resident thereon, determine its own evacuation route (e.g., 430 of FIG. 4) based upon its location such as in room 402 in FIG. 4. This evacuation route can be a default evacuation route which is selected based upon the location at which the handheld wireless device 600 is located. In one embodiment, this determination is made when an emergency notification has been triggered. Alternatively, evacuation agent program 130 can run in the background, in which case the position of handheld wireless device 600 within building 400 is continuously monitored and the determination of which default evacuation route to use is continuously updated as a user moves through the building. This evacuation route, as well as real-time digital map 170 or portions thereof, can be displayed on display device 618. Additionally, as events transpire within building 400, such as a fire at location 470 of perimeter hallway 405, control system 150 can generate updates 190 which inform each handheld wireless device 600 of conditions within, or proximate to, building 400. Thus, a user of handheld wireless device has a portable device which provides evacuation navigation information which can be updated in real-time as conditions develop to assist them in safely evacuating a building or other location. As a result, if a default evacuation route (e.g., 430 of FIG. 4) is no longer usable, an alternative evacuation route (e.g., 420 of FIG. 4) can be generated in real-time to assist in safely evacuating building 400. It is noted that handheld wireless device 600 is well suited for use within buildings or other constructed environments in which GNSS navigation signals, cellular tower triangulation, or other navigation aids may be ineffective. In the example of FIG. 4, in response to the fire at location 470 and notification via update 190, handheld wireless device 600 can autonomously determine that evacuation route 430 is no longer viable as an escape route. As a result, handheld wireless device 600 will automatically generate a second evacuation route (e.g., 420 of FIG. 4) which leads through a service area 406 that is not normally accessible to the public. It is noted that conditions at other locations, such as an evacuation position (e.g., 425 of FIG. 4) may also be monitored by control system 150. Thus, if the evacuation position 425 is unsafe for some reason, that information can be reported to handheld wireless device 600 so that alternative evacuation route(s) can be planned to other evacuation positions. It is noted that in various embodiments, an evacuation route may lead to a plurality of evacuation positions. For example, in some environments such as a mine, factory, or refinery, it may be desirable to access emergency equipment such as a breathing apparatus, fire resistant clothing, or the like to permit safely evacuating the premises. In this instance, handheld wireless device 600 may generate a first evacuation route to an interim destination at which this equipment is stored and subsequently generate at least one more evacuation route to an evacuation position.

In accordance with various embodiments, a user of handheld wireless device 600 can communicate with emergency responders via control system 150 to report their location, conditions within building 400, how many people are with them, or other information such as medical needs etc. Furthermore, using image capture device 632 and/or light 638, handheld wireless device 600 can aid a user in navigating an evacuation route in addition to displaying real-time digital map 170 and evacuation routes on display 618. Thus, a user of handheld wireless device 600 has a portable map (e.g., real-time digital map 170) of building 400 for use in an emergency rather than having to quickly memorize a wall mounted map typically found in most buildings. Additionally, real-time digital map 170 can be updated to display the current conditions in building 400, not only for emergency responders but evacuees using handheld wireless device 600 as well. In accordance with various embodiments, fixed displays 123 (e.g., wall-mounted evacuation displays or information kiosks) are updated in a similar manner to provide users, who do not have a handheld device, an evacuation map which displays the current conditions in building 400 as well.

It is noted that rather than having handheld wireless device 600 perform autonomously, the position monitoring and reporting can be performed in real-time by control system 150. For example, control system 150 can perform real-time monitoring of evacuation routes and the location of each handheld wireless device 600 within or proximate to building 400. Thus, as an evacuee progresses along an evacuation route such as evacuation route 420 of FIG. 4, their proximity to successive position monitors (e.g., 103-7, 103-6 and 103-5 successively) can be detected and reported to control system 150 which monitors the progress of each handheld wireless device 600. It is noted that control system 150 can further generate updates 190 to emergency responder agents 180 to keep them appraised of conditions within building 400 and the location of each registered handheld wireless device 600 within or proximate to building 400. As discussed above, control system 150 can further monitor and report the location of unregistered handheld devices as well. Control system 150 can also generate evacuation routes for each handheld wireless device 600 on the premises of, or proximate to, building 400. In accordance with at least one embodiment, control system 150 can by default generate evacuation routes down hallways and other areas equipped with sprinkler systems or other safety features to enhance the safety of evacuees from building 400.

In accordance with various embodiments, when a user of a handheld wireless device 600 reaches an evacuation position (e.g., 425 of FIG. 4), this is automatically reported to control system 150. For example, if a handheld wireless device 600 detects its proximity to an RFID device of building 400 such as position monitor 103-5, it can be assumed that the user has successfully evacuated to the doorway leading to evacuation position 425. This will be automatically reported by the handheld wireless device to control system 150 so that emergency responders have an accurate accounting of who has evacuated building 400 and who still remains within. Alternatively, position monitor 103-5 can detect the proximity of handheld wireless device 600 and report this information to control system 150. In another embodiment, each evacuation position such as 425 of FIG. 4, is equipped with its own reporting device such as position monitor 103-13 to report each handheld wireless device 600 in its proximity.

Figure 7A:
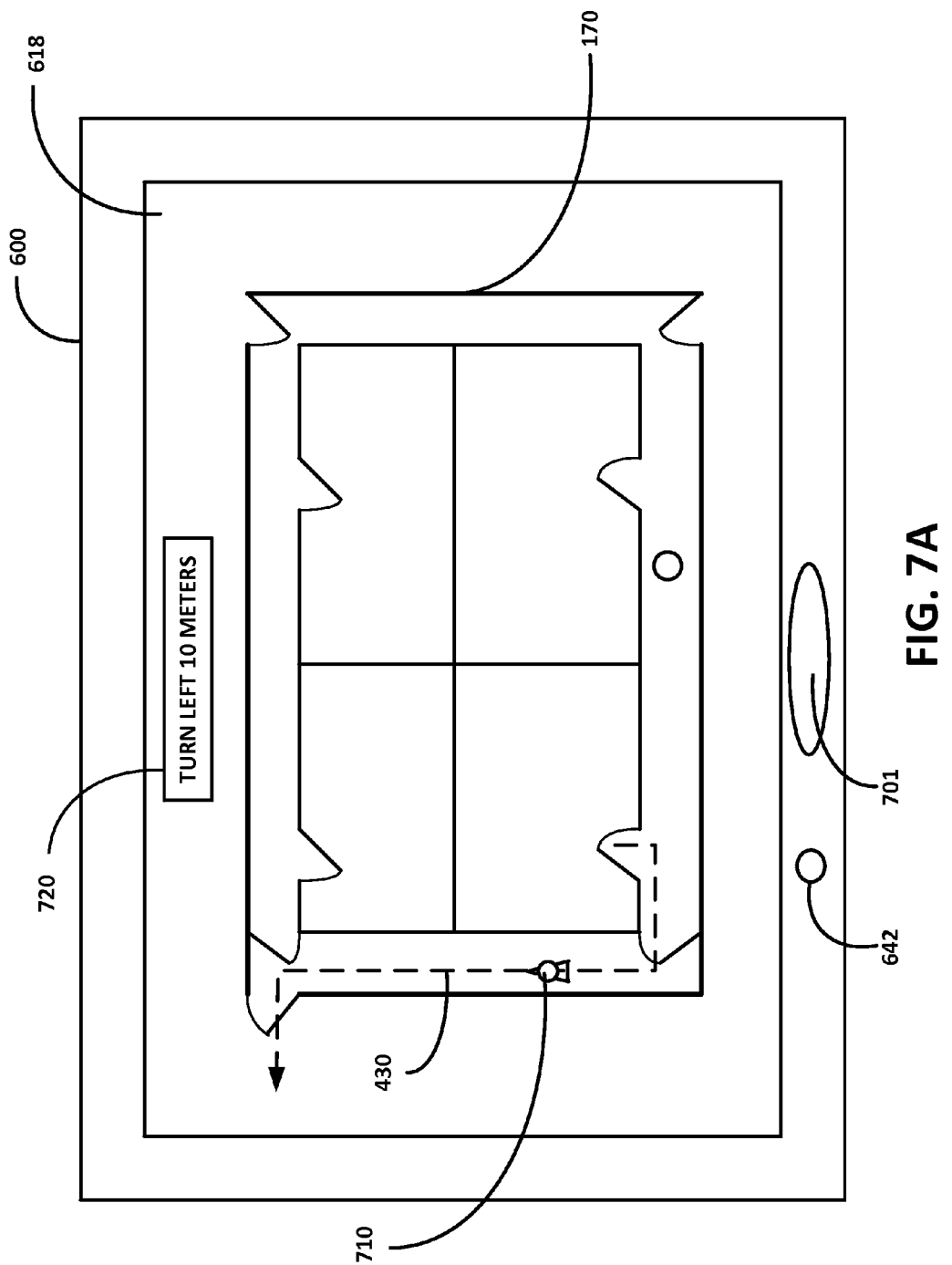
FIG. 7A is an example screenshot of a display of an evacuation navigation device in accordance with various embodiments.
Figure 7B:
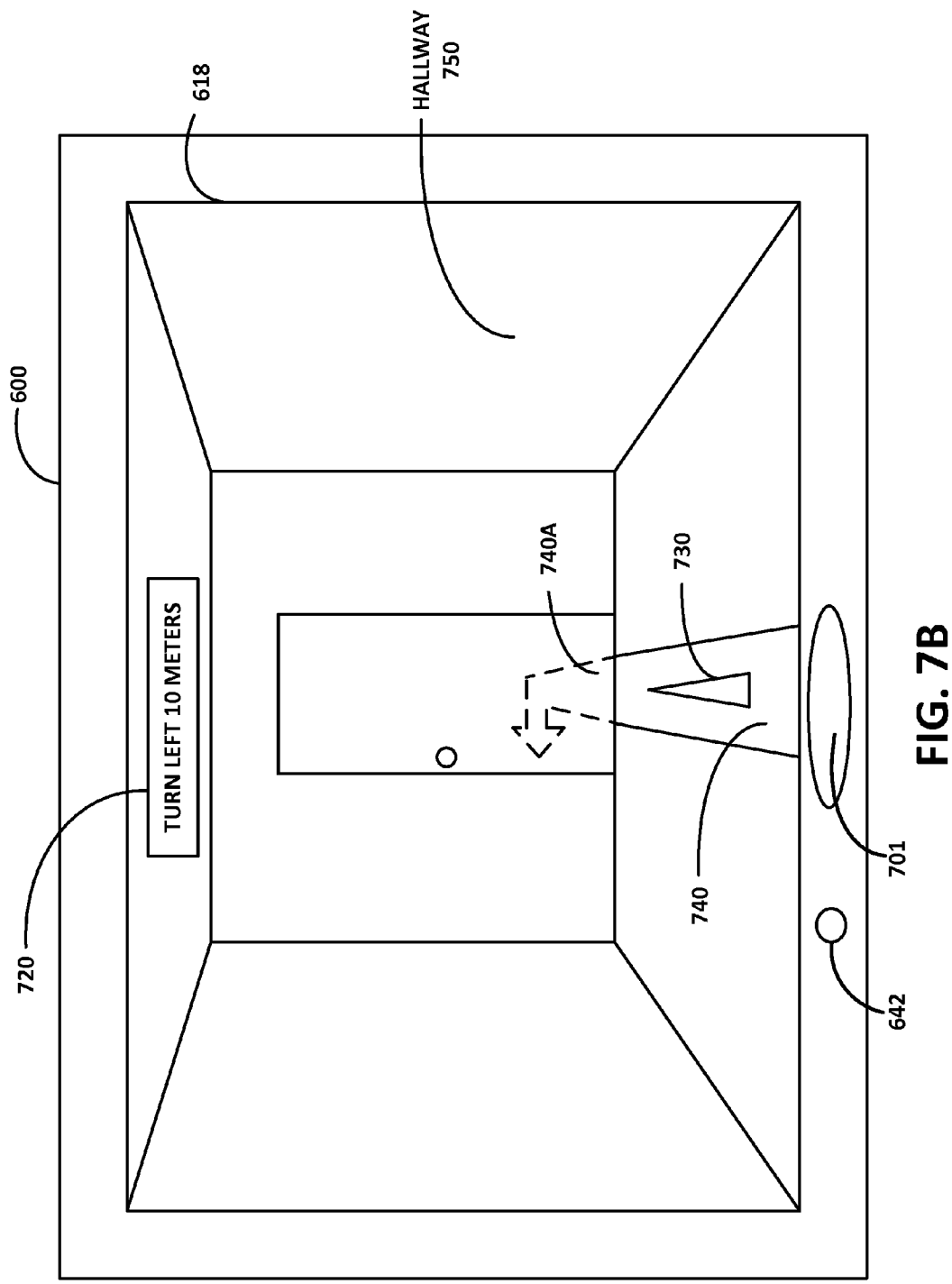
FIG. 7B is an example screenshot of a display of an evacuation navigation device in accordance with various embodiments.

FIG. 7A is an example screenshot of a display of an evacuation navigation device in accordance with various embodiments. In FIG. 7A, handheld wireless device 600 is shown displaying a copy of real-time digital map 170 upon display device 618. In FIG. 7A, handheld wireless device 600 is displaying evacuation route 420 from FIG. 4 to a user of handheld wireless device 600. Also shown in FIG. 7A is an icon 710 which indicates the current position of handheld wireless device 600. It is noted that in accordance with various embodiments, handheld wireless device 600 may be configured with components which permit detecting the orientation (e.g., in one axis such as a horizontal azimuth, or a 3-axis orientation in the X, Y, and Z axes) of handheld wireless device 600. Thus, as a user moves and rotates handheld wireless device 600, the orientation of icon 710 will similarly rotate to convey the orientation of the user with respect to real-time digital map 170. In at least one embodiment, a compass indicator is also displayed which rotates as the user rotates handheld wireless device 600 to provide a better sense of orientation to the user. In accordance with various embodiments, the display of real-time digital map 170 itself will auto-rotate as a user moves so that the direction in which the user is facing is always pointed at the top of display device 618. In another embodiment, the display of real-time digital map 170 is static and icon 710 moves and rotates to indicate the direction a user is facing. In accordance with various embodiments, other visual clues can be provided as guidance for a user of handheld wireless device 600. For example, if a user is following the evacuation route displayed on display device 618, the icon 710, and/or the path displayed as evacuation route 420 may be displayed as green. If the user deviates from the displayed evacuation router by taking a wrong turn, or if a change is dynamically made to the path of the evacuation route, the icon 710 and/or the path displayed as evacuation route 420 may be displayed as red. If a user is approaching some feature, such as a turn in a hallway, doors, stairs, emergency equipment, etc., the icon 710 and/or path displayed as evacuation route 420 may be displayed as yellow. In accordance with at least one embodiment, when icon 710 and/or evacuation route 420 are displayed in red or yellow for the conditions described above, they will also flash intermittently to gain the user's attention. Additionally, an audible notification such as a tone, or vocal warning, may be sounded to further alert the user. In FIG. 7A, a text box 720 also displays instructions to keep a user appraised of alerts, conditions, instructions, and other information useful in safely evacuating building 400. It is further noted that a vocal instruction which repeats the message shown in text box 720 may also be sounded in various embodiments. Also shown in FIG. 7A is a microphone 642 and speaker 701 for communicating with emergency responders. In accordance with at least one embodiment, display 618 is also configured for displaying the real-time environment around handheld wireless device 600 as well as evacuation route information as shown in FIG. 7B. For example, when configured with image capture device 632, a user can capture real-time images of, for example, in FIG. 7B a hallway 750 is displayed on display device 618. Overlaid on top of this image will be a representation of evacuation route 740 and icon 730 indicating the present location of the user of handheld wireless device 600 and orientation with respect to hallway 750. As shown in FIG. 7B, evacuation route 740A shows the continuation of evacuation route 740 past a door which otherwise blocks the viewing of the entirety of evacuation route 7400 and indicates the user of handheld wireless device 600 that a turn is to be followed once the user has moved past the door.

FIG. 8 is a flowchart of a method 800 of for displaying evacuation information in accordance with various embodiments. All of, or a portion of, the embodiments described by flowchart 800 can be implemented using computer-executable instructions which reside, for example, in non-transitory computer-readable storage medium resident on or that can be accessed by a computer system or like device (e.g., cellphones 121, in-room devices 121, fixed displays 123, wearable devices 124, and tablets/phablets 125 of FIG. 1, and computer system 300 of FIG. 3). The non-transitory computer-readable storage medium can be any kind of non-transitory medium that instructions can be stored on. Examples of the non-transitory computer-readable storage medium include but are not limited to: a hard disk drive (HDD), a compact disc (CD), a digital versatile disc (DVD), read only memory (ROM), random access memory (RAM), flash memory and so on. As described above, certain processes and steps of the embodiments of the present invention are realized, in one embodiment, as a series of computer-readable instructions (e.g., software program) that reside within non-transitory computer-readable storage medium accessed by a computer system and that are executed by the processor of the computer system. When executed, the instructions cause the processor (and computer system of which it is a part) to implement the procedures of and associated with flowchart 800.

In operation 810 of FIG. 8, a position of a handheld device comprising a position determining component is determined based upon information received from a positioning system available within a selected environment. As described above, handheld wireless device 600 is configured to autonomously determine its position based upon detection and identification of features within building 400 such position monitors 103, RFID devices, images, etc. and to display that position on display device 618. In accordance with various embodiments, position monitors 103 comprise a positioning system embedded with a selected/constructed environment such as building 400. As described above, position monitors 103 comprise, but are not limited to, an RFID network, a Wi-Fi network, a network in compliance with the IEEE 1902.1 standard (e.g., RuBee), and a network in compliance with the Bluetooth Low Energy (BLE) standard. In at least one embodiment, real-time digital map 170 is stored upon handheld wireless device 600. Real-time digital map 170 can be wirelessly downloaded onto handheld wireless device 600 in response to the triggering of an emergency notification regarding building 400, or preloaded and stored upon handheld wireless device 600.

In operation 820 of FIG. 8, the position of the handheld device is displayed on a digital map of the selected environment and at least one evacuation route from the position to an evacuation position using a display device of the handheld device. As described above, the position of handheld wireless device 600 (e.g., icon 710 of FIG. 7A) as well as an evacuation route (e.g., 430 of FIG. 4) is displayed on a copy of real-time digital map 170. This facilitates navigating the evacuation route displayed on handheld wireless device 600 by a user to an evacuation position.

In operation 830 of FIG. 8, a real-time update of safety conditions along said at least one evacuation route is received using a wireless communication component of said handheld device. As described above, environmental monitors 102 provide real-time updates of conditions within building 400 which facilitate reporting changing conditions as they occur. In accordance with at least embodiment, real-time updates (e.g., 190 of FIG. 1) of safety conditions along evacuation route 430 in response to reports from environmental monitors 102 which are embedded within building 400. In one embodiment, the generating of real-time updates 190 of safety conditions along evacuation route 430 is performed remotely from handheld wireless device 600 such as by control system 150. These real-time updates of safety conditions are conveyed to handheld wireless device 600 via wireless communication component(s) 630.

In operation 840 of FIG. 8, the digital map is dynamically revised based upon the real-time update using logic implemented by a processor of the handheld device. In accordance with various embodiments, real-time digital map 170 can be dynamically revised by handheld wireless device 600 as a result of applying updates 190 as they are received. In another embodiment, real-time digital map 170 is updated by control system 150 and the updated version is sent in its entirety to handheld wireless device 600. In one embodiment, handheld wireless device 600 is configured to autonomously select a second evacuation route (e.g., 420 of FIG. 4) based upon real-time updates of conditions along an evacuation route. For example, in response to a real-time update showing a fire at location 470 of FIG. 4, handheld wireless device 600 can generate and select a second evacuation route (e.g., 420 of FIG. 4). Alternatively, this generating of a second evacuation route can be performed by control system 150 as well. In accordance with various embodiments, handheld wireless device 600 is further configured with a wireless transceiver (e.g., wireless communication component(s) 630 of FIG. 6) which can be used to permit wireless communication with an emergency responder agent (e.g., 180 of FIG. 1). Furthermore, handheld wireless device 600 can generate a notification when it has reached an evacuation position. In one embodiment, evacuation agent program 130 can be downloaded onto a cellular telephone which permits cellphone 120 to access and revise real-time digital map 170 based upon real-time updates 190 generated by control system 150.

Figure 9:
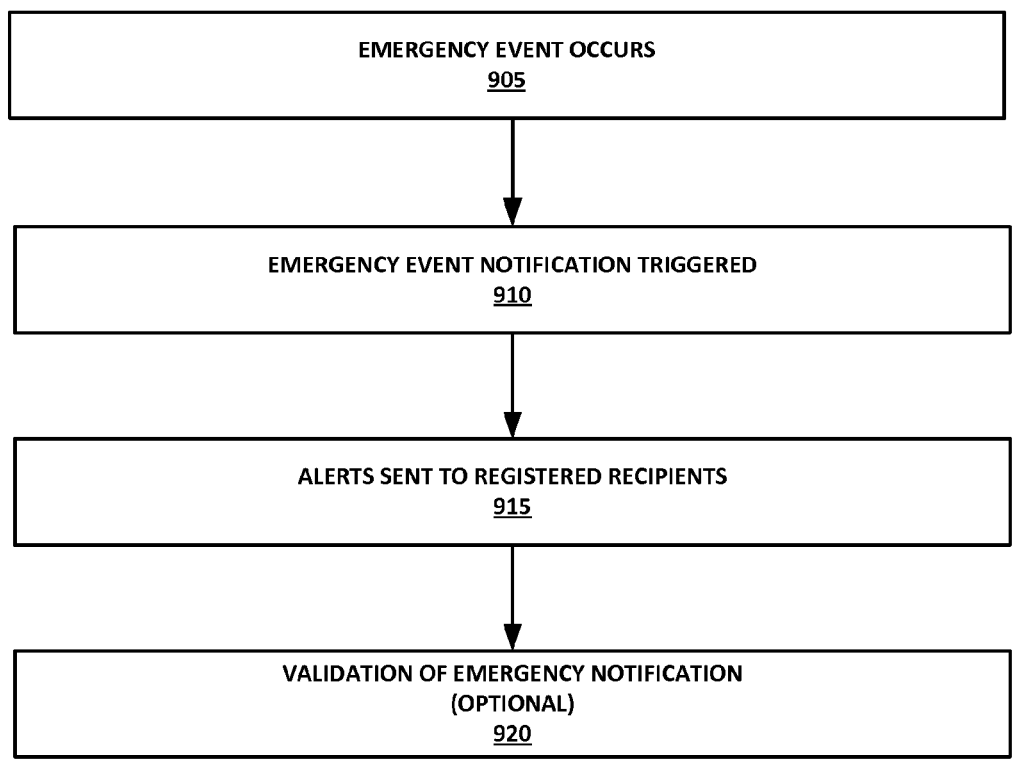
FIG. 9 is a flowchart of communication events which occur in accordance with various embodiments.

FIG. 9 is a flowchart of communication events which occurs in accordance with various embodiments. All of, or a portion of, the embodiments described by flowchart 900 can be implemented using computer-executable instructions which reside, for example, in non-transitory computer-readable storage medium resident on or that can be accessed by a computer system or like device (e.g., cellphones 121, in-room devices 121, fixed displays 123, wearable devices 124, and tablets/phablets 125 of FIG. 1, and computer system 300 of FIG. 3). The non-transitory computer-readable storage medium can be any kind of non-transitory medium that instructions can be stored on. Examples of the non-transitory computer-readable storage medium include but are not limited to: a hard disk drive (HDD), a compact disc (CD), a digital versatile disc (DVD), read only memory (ROM), random access memory (RAM), flash memory and so on. As described above, certain processes and steps of the embodiments of the present invention are realized, in one embodiment, as a series of computer-readable instructions (e.g., software program) that reside within non-transitory computer-readable storage medium accessed by a computer system and that are executed by the processor of the computer system. When executed, the instructions cause the processor (and computer system of which it is a part) to implement the procedures of and associated with flowchart 900.

In operation 905 of FIG. 9, an emergency event occurs. As described above, responder-ready reporting network and emergency evacuation system 100 can be deployed in a variety of selected environments. In various embodiments, the selected environment comprises a constructed environment including, but not limited to, buildings, refineries, mining operations, subways or other sub-surface features, a ships, etc. It is noted that depending upon the environment where responder-ready reporting network and emergency evacuation system 100 is deployed, some events may be considered emergency events which may/may not be considered an emergency event in other environments.

In operation 910 of FIG. 9, an emergency notification is triggered. In accordance with various embodiments, an emergency notification can be triggered automatically in response to detection by real-time environmental monitors 102 which can be selected and/or configured to monitor and report specific types of emergency events within a selected environment. Additionally, an emergency notification can be generated manually (e.g., via manual inputs 105 of FIG. 1). In accordance with various embodiments, when a user picks up an in-room device 121, this event initiates generating an emergency notification to various emergency responder agents including, but not limited to, a 911 call center. Similarly, occupants of a selected environment can use their personal device(s) (e.g., cellphones 120, wearable devices 124, and/or tablets/phablets 125) to initiate triggering an emergency notification using evacuation agent program 130 which has been downloaded onto their device. Additionally, occupants of the selected environment can initiate triggering an emergency notification using fixed displays 123 (e.g., a wall-mounted electronic display device, an information kiosk, etc.) which may be disposed within the selected environment.

In operation 915 of FIG. 9, alerts are sent to registered recipients. In accordance with various embodiments, alerts are sent to emergency responder agent(s) 180. As described above, emergency responder agents can include, but are not limited to, emergency call centers (e.g., 911 call centers, E911 call centers, NG911 call centers, etc.), a person working for an emergency responder agency, or computer system (e.g., a desktop computer system, a laptop computer system, a tablet computer system, a smartphone, a wearable device (e.g., an optical head-mounted display such as Google Glass, a wrist-worn computer system, etc.), or other type of user portable computing device) used by an emergency responder agency. As described above, the alert sent to an emergency responder agent can include, but is not limited to, the type and location (e.g., where within building 400) the emergency is, what triggered the emergency notification, a copy of real-time digital map 170, a web-link to a website for accessing real-time digital map 170, a user identification and password for accessing real-time digital map 170, an update to real-time digital map 170, a location of a secured box (e.g., 410 of FIG. 4) comprising a hard disk drive or other data storage device having evacuation, a combination for unlocking the secured box, etc. In accordance with various embodiments, the alerts to emergency responder agent(s) 180 further comprises updates 190 which convey real-time updates of environmental conditions within building 400 and the location of registered devices (e.g., cellphones 120, in-room devices 121, fixed displays 123, wearable devices 124, and tablets/phablets 125) as well as un-registered devices such as cellphones which may still be detectable by position monitors 103 (e.g., Wi-Fi routers, Bluetooth devices, ZigBee networks, etc.). Furthermore, the alerts sent to emergency responder agent(s) 180 comprises a communications link to each registered device within building 400. For example, each cellphone 120 can register its number with control system 150 when the user enters building 400. Alternatively, Wi-Fi, Bluetooth, ZigBee, RuBee, or other communication links discussed above can be provided to facilitate real-time voice and/or imaging, including streaming video, from registered devices (e.g., cellphones 120, in-room devices 121, fixed displays 123, wearable devices 124, and tablets/phablets 125) and fixed displays 123.

Additionally, alerts are sent from control system 150 to each of the devices which has been registered to it. In various embodiments this includes personal devices of users (e.g., cellphones 120, in-room devices 121, wearable devices 124, and tablets/phablets 125) as well as fixed displays 123. In accordance with various embodiments, the alerts sent to registered devices comprises a copy of real-time digital map 170 as well as real-time updates (e.g., updates 190) based upon information collected by real-time environmental monitors 102 and/or position monitors 103. Furthermore, the alert(s) sent to registered devices comprises an evacuation route which has been determined by control system 150. In accordance with various embodiments, these alerts are dynamically updated based upon the position of the registered device within building 400 and/or updates of the conditions within building 400 based upon information from real-time environmental monitors 102. Additionally, alerts sent to registered devices can comprise verbal communications from emergency responder agent 180 which can be sent, for example, via control center 150. Alternatively, control center 150 can provide contact information (e.g., a cellphone number, or IP address of a registered device) to emergency responder agent 180 who can then bypass control center 150 and directly contact that device.

In operation 920 of FIG. 9, validation of the emergency notification is optionally performed. In accordance with various embodiments, emergency responder agent 180 can contact a designated representative to verify that the emergency notification is valid and that an emergency response is necessary. As discussed above, this can be in response to an automatically generated emergency notification generated by control system 150 in response to manual inputs 105, or from a real-time environmental monitor 102.

Conclusion

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A system for emergency evacuation navigation comprising:

a control system configured for real-time managing a digital map of a selected environment;

a database configured to store said digital map of said selected environment and to download said digital map onto an emergency responder agent, wherein said database comprises a removable data storage device disposed in a secured box at a location proximate or within said selected environment, said removable data storage device containing a copy of said digital map of said selected environment, and wherein, in the instance of an emergency, said control system is configured to communicate said location of said secured box to said emergency responder agent and to remotely unlock said secured box;

a positioning network available within said selected environment and configured to report a position of a handheld device within said digital map of said selected environment to said control system; and a wireless communication interface disposed within said selected environment and configured to facilitate communications between said emergency responder agent and said handheld device, wherein said removable storage device provides information to said emergency responder agent for accessing said wireless communication interface.

2. The system of claim 1 wherein said handheld device includes a position determining component having access to at least one positioning system, wherein said selected environment comprises a constructed environment and wherein said at least one positioning system is embedded within said constructed environment.

3. The system of claim 2 wherein said at least one positioning system comprises a Radio-frequency identification (RFID) network embedded within said constructed environment.

4. The system of claim 2 wherein said at least one positioning system comprises a Wi-Fi network embedded within said constructed environment.

5. The system of claim 2 wherein said at least one positioning system comprises a network in compliance with Institute of Electrical and Electronics Engineers (IEEE) 1902.1 standards.

6. The system of claim 2 wherein said at least one positioning system comprises a network in compliance with Bluetooth Low Energy (BLE) standards.

7. The system of claim 1 wherein a real-time update of safety conditions along at least one evacuation route is generated by said control system remotely from said handheld device and is received by said handheld device via said wireless communication network.

8. The system of claim 1 wherein said handheld device includes a wireless transceiver configured to permit wireless communication with said emergency responder agent.

9. The system of claim 1 wherein said handheld device is further configured to generate a notification, to said control system, when it has reached a defined safe area.

10. The system of claim 1 wherein said handheld device comprises a cellular telephone.

11. A method comprising:

managing, by a control system, a digital map of a selected environment;

storing, by a database, said digital map of said selected environment and downloading said digital map onto an emergency responder agent, wherein said database comprises a removable data storage device disposed in a secured box at a location proximate or within said selected environment, said removable data storage device containing a copy of said digital map of said selected environment;

communicating, by said control system, in the instance of an emergency said location of said secured box to said emergency responder agent and remotely unlocking said secured box;

reporting, by a positioning network available within said selected environment, a position of a handheld device within said digital map of said selected environment to said control system;

facilitating communications, by a wireless communication interface disposed within said selected environment, between said emergency responder agent and said handheld device; and providing information, by said removable storage device, to said emergency responder agent for accessing said wireless communication interface.

12. The method of claim 11 wherein said selected environment comprises a constructed environment, said method further comprising:

displaying said position of said handheld device on a digital map of said constructed environment and at least one evacuation route from said position to an evacuation position using a display device of said handheld device.

13. The method of claim 12 further comprising:

determining a position of said handheld device wherein said positioning system is embedded within said constructed environment.

14. The method of claim 11 further comprising:

storing said digital map of said selected environment in a non-transitory computer-readable storage medium resident within said handheld device.

15. The method of claim 11 further comprising:

generating a real-time update of safety conditions along at least one evacuation route in response to a report from an environmental monitor embedded within said selected environment.

16. The method of claim 15 further comprising:

generating said real-time update of safety conditions along said at least one evacuation route remotely from said handheld device; and conveying said real-time update of safety conditions along said at least one evacuation route to said handheld device via a wireless communication component of said handheld device.

17. The method of claim 15 further comprising:

autonomously selecting by said handheld device a second evacuation route based upon said real-time update of safety conditions along said at least one evacuation route.

* * * * *